United States Patent [19]

Globig et al.

[11] Patent Number: 4,907,885
[45] Date of Patent: Mar. 13, 1990

[54] HETERODYNE LASER DIAGNOSTIC SYSTEM

[75] Inventors: Michael A. Globig, Antioch; Michael A. Johnson, Pleasanton; Richard W. Wyeth, Livermore, all of Calif.

[73] Assignee: The United States of America as represented by the United States Department of Energy, Washington, D.C.

[21] Appl. No.: 297,527

[22] Filed: Jan. 17, 1989

Related U.S. Application Data

[63] Continuation-in-part of Ser. No. 911,023, Sep. 24, 1986, Pat. No. 4,798,467.

[51] Int. Cl.$^4$ .................................................. G01B 9/02
[52] U.S. Cl. .................................... 356/349; 372/32
[58] Field of Search ................ 356/349, 346, 351, 5, 356/345; 372/32, 20

[56] References Cited

U.S. PATENT DOCUMENTS

| | | | |
|---|---|---|---|
| 4,190,362 | 2/1980 | Dubrunfaut | 356/5 |
| 4,329,664 | 5/1982 | Javan | 372/32 |
| 4,817,099 | 3/1989 | Javan | 372/32 |
| 4,817,101 | 3/1989 | Wyeth et al. | 372/32 |

FOREIGN PATENT DOCUMENTS 2164221 3/1986 United Kingdom .................... 356/5

OTHER PUBLICATIONS

Burghardt et al, "Beat frequency generation . . . in the 80–GHz band", Applied Phys. Lett. vol. 35, No. 7, Oct. 1979, pp. 498–500.

Primary Examiner—Eugene R. LaRoche
Assistant Examiner—Seung Ham
Attorney, Agent, or Firm—Miguel A. Valdes; Roger S. Gaither; William R. Moser

[57] ABSTRACT

The heterodyne laser diagnostic system includes, in one embodiment, an average power pulsed laser optical spectrum analyzer for determining the average power of the pulsed laser. In another embodiment, the system includes a pulsed laser instantaneous optical frequency measurement for determining the instantaneous optical frequency of the pulsed laser.

6 Claims, 32 Drawing Sheets

HETERODYNE LASER DIAGNOSTIC SYSTEM

FIELD OF THE INVENTION

The U.S. Government has rights in this invention pursuant to Contract No. W-7405-ENG-48 between the United States Department of Energy and the University of California for operation under Lawrence Livermore National Laboratory.

This application is a continuation-in-part of application Ser. No. 911,023, filed Sept. 24, 1986, now U.S. Pat. No. 4,798,467; issued Jan. 17, 1989, entitled Heterodyne Laser Instantaneous Frequency Measurement System.

BACKGROUND OF THE INVENTION

The present invention is related to a heterodyne laser diagnostic system.

In many laser applications, it is important to know the average power of the pulsed laser, and it is also desirable to provide the capability of determining the instantaneous optical frequency of the pulsed laser.

SUMMARY OF THE INVENTION

It is an object of the present invention to provide a heterodyne laser diagnostic system.

It is a more particular object to provide an average power pulsed laser optical spectrum analyzer.

It is a further object of the invention to provide a pulsed laser instantaneous optical frequency measurement system.

According to one aspect of the present invention, the laser optical spectrum analyzer includes a pulsed laser, a continuous wave (CW) laser, and means for measuring the average power spectrum of the pulsed laser.

The means for measuring include means for heterodyning the pulsed laser with the CW laser to form a heterodyned output, means for detecting the heterodyned output, and means for analyzing the heterodyned output, including means for sampling the output of the analyzer means and means for plotting the average frequency spectrum of the pulsed laser.

According to another aspect of the present invention, a system is provided which includes means for measuring the instantaneous frequency of a pulsed laser.

The system includes means for analyzing in a time domain the heterodyned output of the pulsed laser and the CW laser, and means for plotting the frequency of a single pulse of the pulsed laser.

Further objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate a preferred embodiment of the invention and, together with the description, serve to explain the principles of the invention.

DETAILED DESCRIPTION OF THE DRAWINGS

System Configuration

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
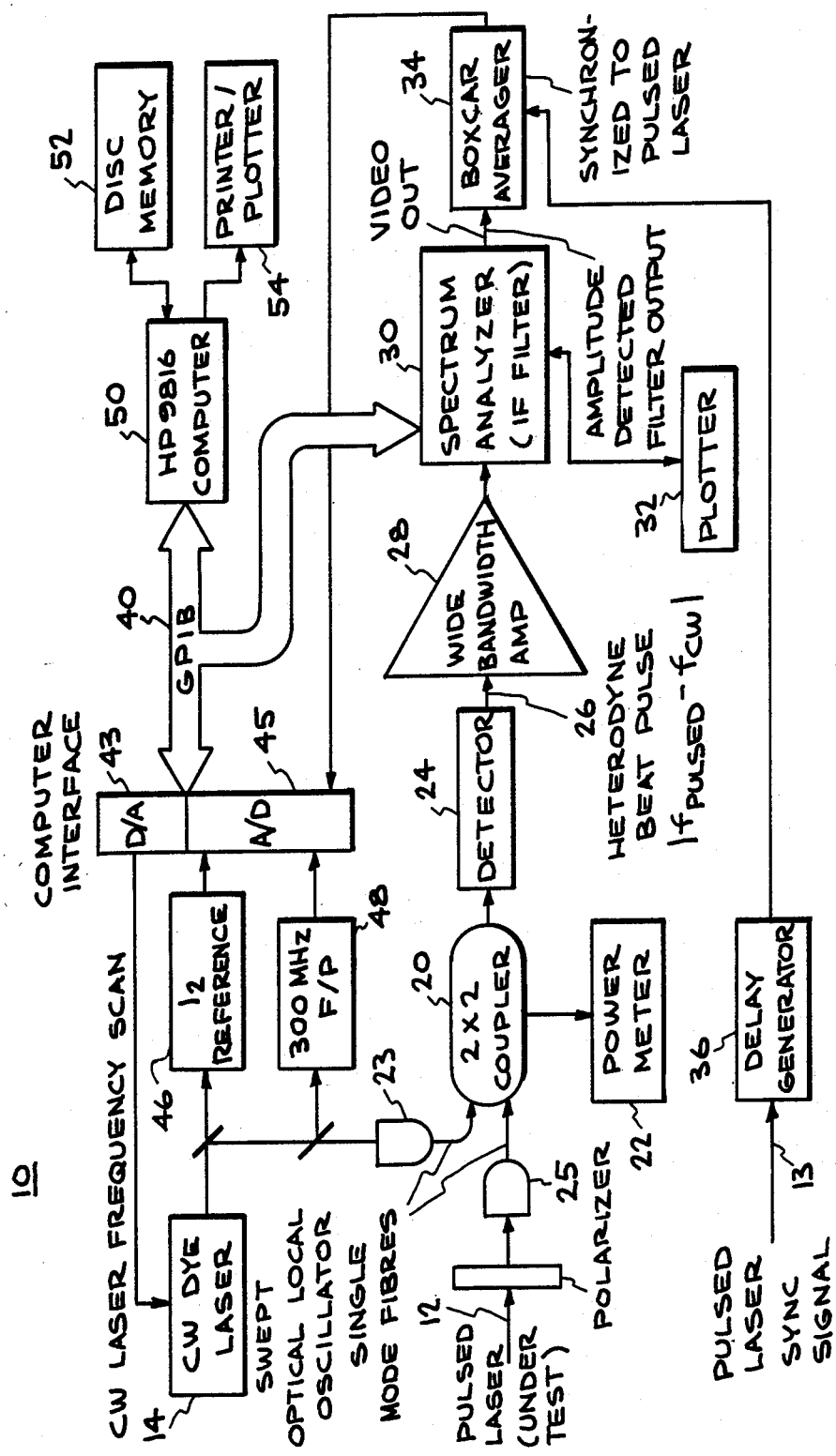
FIG. 1 depicts an average power pulsed laser optical spectrum analyzer.

A block diagram of an average power pulsed laser optical spectrum analyzer 10 is shown in FIG. 1. The average power spectrum of a pulsed laser 12 is measured by heterodyning the pulsed laser under test with a cw dye laser 14. The heterodyning is accomplished by combining small samples of the two laser signals using a single mode fiber coupler 20 for input to a fiber "pigtailed" wide-bandwidth PIN-diode detector 24.

The detected heterodyne output 26 (a pulsed microwave or rf signal) is amplified by amplifier 28 and sent to a wide-bandwidth electronic spectrum analyzer 30. The spectrum analyzer 30 functions as a narrow bandwidth filter (at a highly accurate selectable offset frequency) followed by an amplitude envelope detector. The output of the spectrum analyzer 30 is then sampled by a boxcar averager 34 with a time gate that is synchronized with the envelope of the heterodyne beat pulse.

Synchronization is accomplished by appropriate delay of a timing pulse 13 from the pulsed laser system through delay generator 36. The cw dye laser 14 is swept in frequency while recording the boxcar-averaged spectrum analyzer output versus time, resulting in a plot of the pulsed laser's average frequency spectrum.

Figure 2:
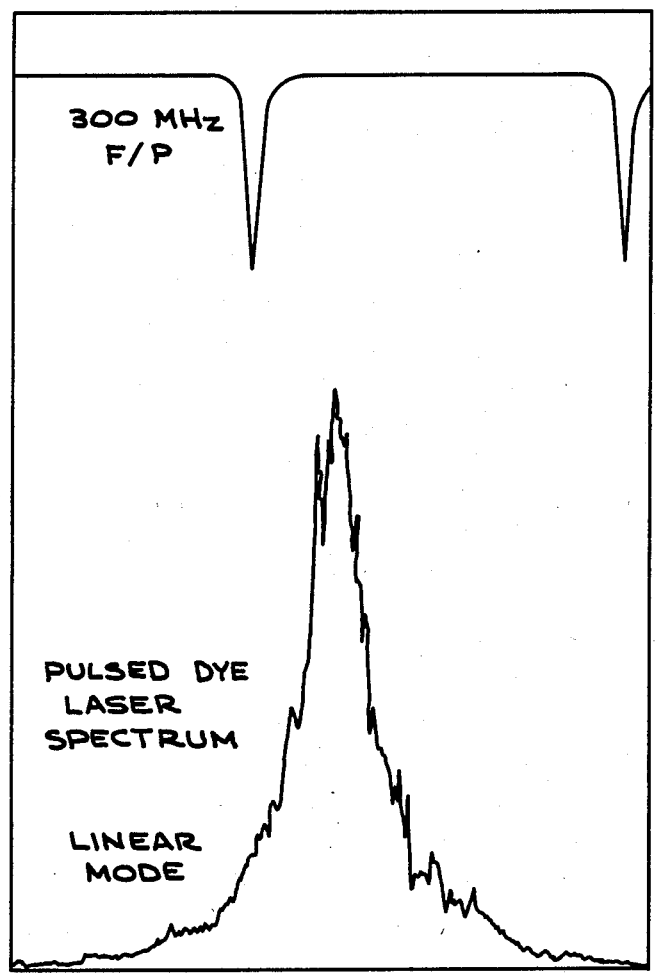
FIG. 2 depicts boxcar output data from the optical spectrum analyzer of FIG. 1 showing linewidth of a pulsed laser.

The duty cycle of the pulsed heterodyne beat signal 26 is very small, approximately 1 part in 4000, and use of the boxcar averager 34 results in a substantial increase in signal-to-noise ratio. The time constant and gate length of the boxcar averager 34, the resolution bandwidth of the spectrum analyzer 30 and the sweep speed of the cw dye laser 14 are chosen to be consistent with the required optical frequency resolution and signal-to-noise ratio. A plot of the output signal from the boxcar versus time is equivalent to the time averaged frequency spectrum of the pulsed laser 12. FIG. 2 shows some typical boxcar output data that were obtained by averaging a 50-second frequency scan having a scan width of about 600 MHz.

Logarithmic and Linear Display Modes

If the spectrum analyzer 30 of FIG. 1 is operated in the logarithmic mode, the plots obtained represent the average magnitude of the optical intensity (power) versus frequency of the pulsed laser in db units. In the logarithmic mode, a 3 db difference represents a relative power spectral density ratio of 2. The logarithmic mode of operation makes best use of the wide dynamic range achievable with the system. Dynamic ranges exceeding 30 db were routinely observed.

If the spectrum analyzer 30 is operated in the linear mode, the plots represent the average magnitude of the electric field versus frequency. In the linear mode, a relative power spectral density ratio of 2 is represented by an amplitude ratio of the square root of 2 (optical power or intensity is proportional to the square of the electric field) The linear mode of operation is normally used for half-power full-width spectral linewidth measurements (half-power points are at 0.707 times the peak amplitude).

Figure 3A:
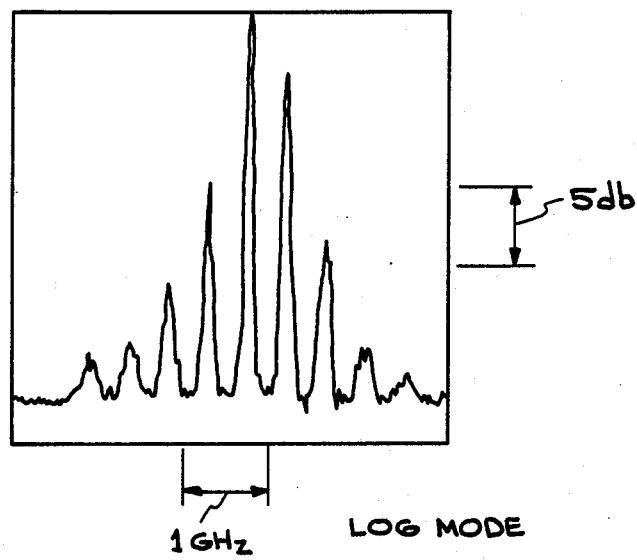
FIGS. 3A and 3B depict a comparison of log and linear mode data of the optical spectrum analyzer of FIG. 1.
Figure 3B:
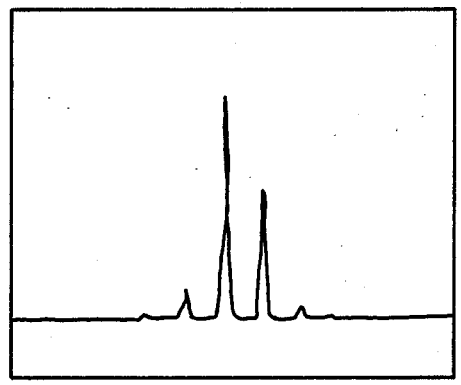

FIG. 3 gives examples of log and linear data. The data shown were taken at the output of the last amplifier of a dye amplifier chain using two common dye master oscillators separated in frequency by approximately 450 MHz. Several intermodulation products are visible.

Flat Frequency Response

During the laser scan, the optical detector and amplifier are operated with a constant filter offset frequency. Assuming constant power from the scanned cw laser 14, the frequency response of the optical spectrum analyzer is therefore flat over the entire scan width of the cw laser 14. The Coherent 699-29 laser used in the tests can be scanned over 40 GHz without major adjustment of the frequency determining elements in the ring cavity. Furthermore, the laser can be scanned under computer control over the entire dye range (which is of the order to tens of nanometers and dependent on which dye is used). Major adjustments are required to the etalons and birefringent filter at about 40 GHz intervals and laser power variation will be experienced because of this adjustment. Accuracy of spectral magnitude measurements for extremely wide scan widths can be improved substantially by normalizing the boxcar output signal to variations in the electric field strength of the cw dye laser 14.

Dual Imaging of the Pulsed Laser Spectrum

The pulsed laser spectrum is imaged on the spectrum analyzer display 32 or 54 for both a negative and a positive difference frequency between the two lasers 12, 14. The separation between the two images is exactly twice the center frequency of the spectrum analyzer filter. This provides a convenient and highly accurate means of calibrating the frequency axis of the display. The ambiguity caused by the dual imaging is easy to resolve since the images are exact copies separated by a known distance. If a spectral feature is confused by overlap of the images, image separation can be modified by choosing a more convenient filter center frequency.

Figure 4:
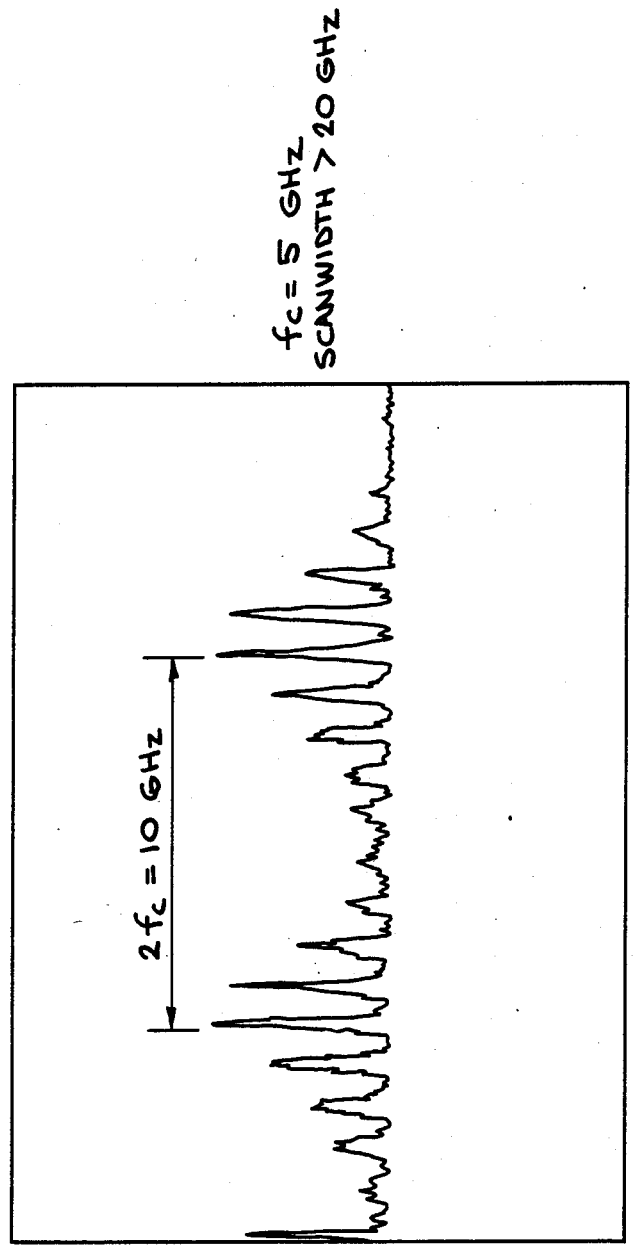
FIG. 4 depicts a spectrum analyzer sweep used to scan a CW dye laser of a wide scan range.

FIG. 4 shows two images of a complex pulsed laser spectrum separated by 10 GHz, twice the 5 GHz center frequency of the filter. In FIG. 4, the spectrum analyzer sweep was used to scan CW dye laser over a wide scan range. A complex pulsed laser spectrum is imaged twice on the spectrum analyzer. Image separation is at $2f_c$ ($f_c$ is held constant at 5 GHz).

Referencing Frequency Measurements to a Stable Absolute Standard

A portion of the cw laser 14 output is also sent to an apparatus 46, 48 that produces the Doppler-free absorption spectrum of molecular iodine vapor The iodine spectrum contains somewhat irregularly shaped groups of highly stable features separated by no more than 10–15 GHz throughout the yellow-red end of the visible spectrum. These features represent the hyperfine structure of molecular iodine vibrational states and are stable in absolute frequency to better than 0.2 MHz with center frequencies that are easily resolved to better than 1 MHz.

The pulsed laser spectrum and the iodine spectrum are recorded simultaneously in time with an offset in optical frequency equal to the filter center frequency. The offset between the pulsed laser's frequency and a reference feature in the iodine spectrum can therefore be measured with maximum errors of about 1 MHz by varying the center frequency of the filter until the iodine feature and the laser pulsed spectrum are aligned on the time axis of the display. The offset is then equal to the center frequency of the filter. The spectrum analyzer 30 employed as the filter in the tests uses digital phase-lock techniques and a highly stable reference oscillator to set the center frequency of the filter with an accuracy of better than 100 Hz. The errors in the center frequency control circuitry are therefore insignificant when compared to the line width of the pulsed laser (at least 5–10 MHz due to Fourier broadening) and the resolution obtainable from the hyperfine iodine lines (about 1 MHz).

Computer Control and Display Options

GPIB interfaces 40 allow both control of system components from an external computer 50 as well as digital recording of data. The computer 50 controls the sweep of the cw dye laser 14 using a digital-to-analog converter 43 and digitizes through A/D 45 the analog output signals from the boxcar averager 34, from the iodine spectroscopy setup 46, and from a 300 MHz Febry-Perot etalon 48. Using these data, the computer 50 also generates graphical displays of the spectrum of the pulsed laser.

Figure 5A:
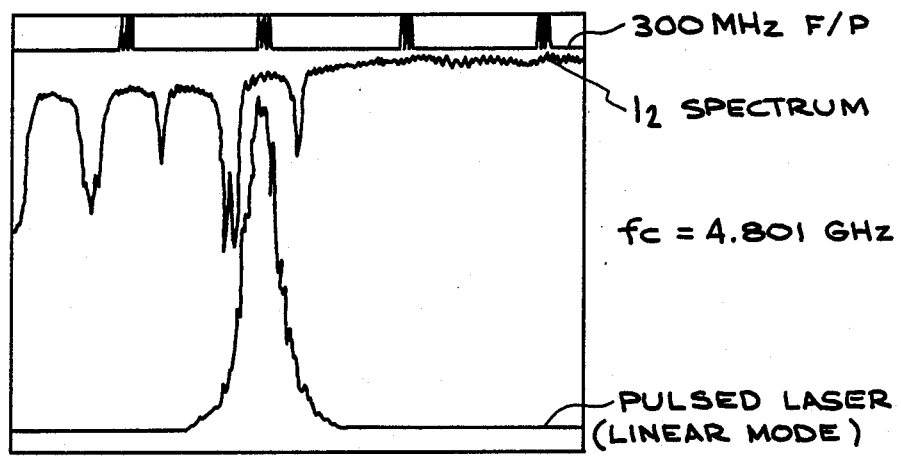
FIGS. 5A and 5B depict an optical spectrum analyzer sample computer generated display.
Figure 5B:
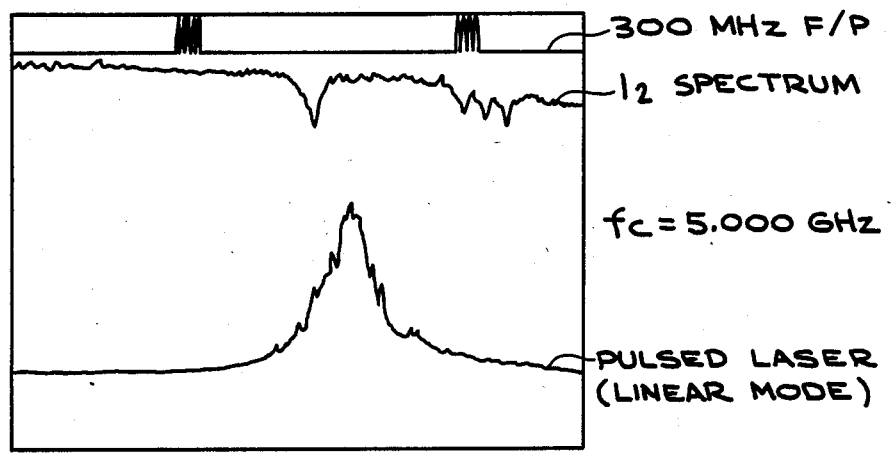

FIG. 5 is an example of a computer generated graphical display. The bottom trace is the output of the boxcar averager 34 showing the pulsed laser spectrum. The middle trace is the Doppler-free iodine spectrum. The top trace is the output from a 300 MHz Fabry-Perot etalon 48 that also samples the scanned cw laser and gives a rough scale for the frequency axis. The offset between the iodine hyperfine spectrum and the pulsed laser spectrum is exactly equal to the value of the filter center frequency. If a certain offset is set at the desired offset, and the display provides an indication of the error in the pulsed laser frequency.

The offset frequency of multiple-pulsed-laser spectral features may be displayed by modifying the center frequency of the filter and repeating the cw laser scan, or by using multiple parallel filters with the appropriate center frequencies for simultaneous plots. Interleaved time sets of pulsed-laser heterodyne beat signals may be separated and compared by appropriate triggering of the time gate of the boxcar averager 34 during repeated cw laser scans. Similarly, multiple boxcars may be used in a parallel configuration with appropriate time gating to produce simultaneous data on different pulsed-laser time sets. Software to analyze the data and generate error signals for long-term pulsed-laser frequency-control servo loops is also feasible.

Possible Applications

The following measurements are possible using the heterodyne optical spectrum analysis technique described above:

Average frequency spectrum of a repetitive pulsed laser.

Relative power level of various spectral components of a pulsed laser.

Average spectral linewidth and shape of one or more spectral components of a pulsed laser.

Average frequency offset of the various spectral components of a pulsed laser from a stable absolute reference with accuracy and repeatability of about 1 MHz.

Ability to separate all of the above data for multiple time sets of a pulsed laser.

Using a precision fiber positioner and appropriate imaging optics at the input of the fiber that samples the pulsed laser, investigate all of the above measurements as a function of spatial position within a laser beam.

Using a polarizer before the input of the pulsed laser sampling fiber, investigate the effect of polarization of the pulsed laser.

Using multiple sampling fibers at key locations in a laser MOPA (Master Oscillator Power Amplifier) chain, investigate relative performance variations before and after amplification.

The maximum laser power level required at the fiber input, assuming 10% overall efficiency of the coupling and transmission optics to the detector, is 50 milliwatts peak (or for a 50 ns, 5 KHz pulsed laser about 12.5 microwatts average).

INSTANTANEOUS FREQUENCY MEASUREMENT OF PULSED LASERS

System Configuration

Figure 6:
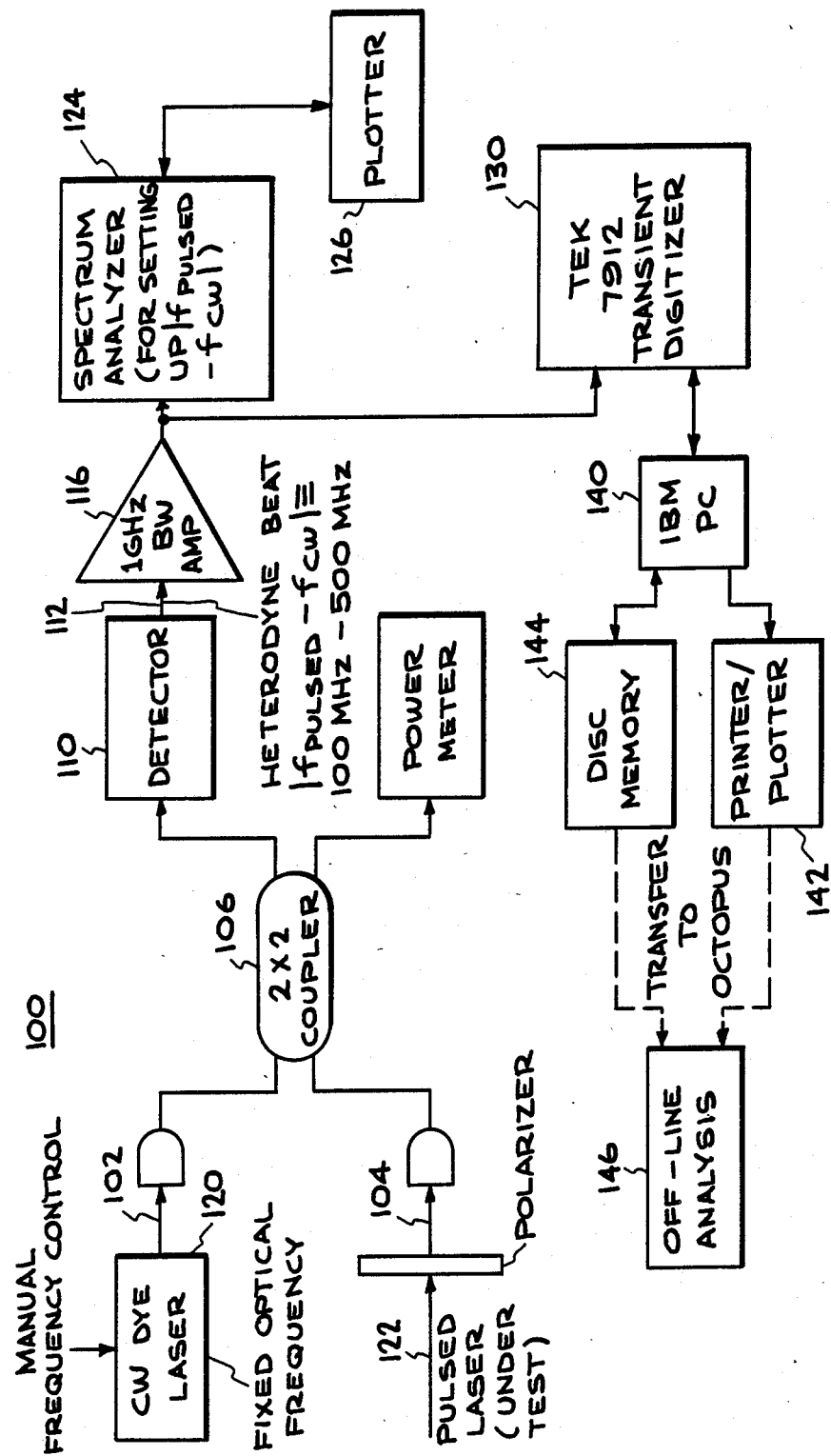
FIG. 6 depicts a pulsed laser instantaneous optical frequency measurement.

A system configuration 100 used for instantaneous frequency pulsed-laser measurements is shown in FIG. 6. The cw-laser/pulsed-laser heterodyne beat pulse is generated in much the same way as in the previously described system, using single mode fibers 102, 104, a fiber coupler 106, and a PIN-diode wide bandwidth detector 110. However, the cw laser 120 is typically offset from the dye laser 122 by only 100-500 MHz, and data are collected in the time domain rather than the frequency domain. Data are taken from a single laser pulse rather than as the average of many laser pulses. The output beat signal pulse 112 from the PIN diode 110 is first amplified by a 0.1 MHz-to-1.2 GHz bandwidth amplifier 116 and then recorded by a Tektronix 7912 transient digitizer 130 with a sample interval of approximately 200 ps and a vertical deflection bandwidth of about 1 GHz.

Pulse to Pulse Frequency Variations and Frequency Chirp Within a Pulse

Analysis of the time domain beat signal provides information on changes of the pulse frequency during a pulse (chirp). Data collected from several pulses within a short time interval may be compared to study pulse-to-pulse variations of laser average frequency, chirp, etc. The pulsed data have been analyzed using several methods.

The first "quick look" method of analysis is of course, to examine the data by eye. The average offset frequency between the two lasers 120, 122 is estimated by counting the number of cycles in a measured time interval. Large chirps in pulsed laser frequency are obvious and may be estimated by comparing the periods of complete cycles of the best waveform at various locations within the pulse.

Figure 7:
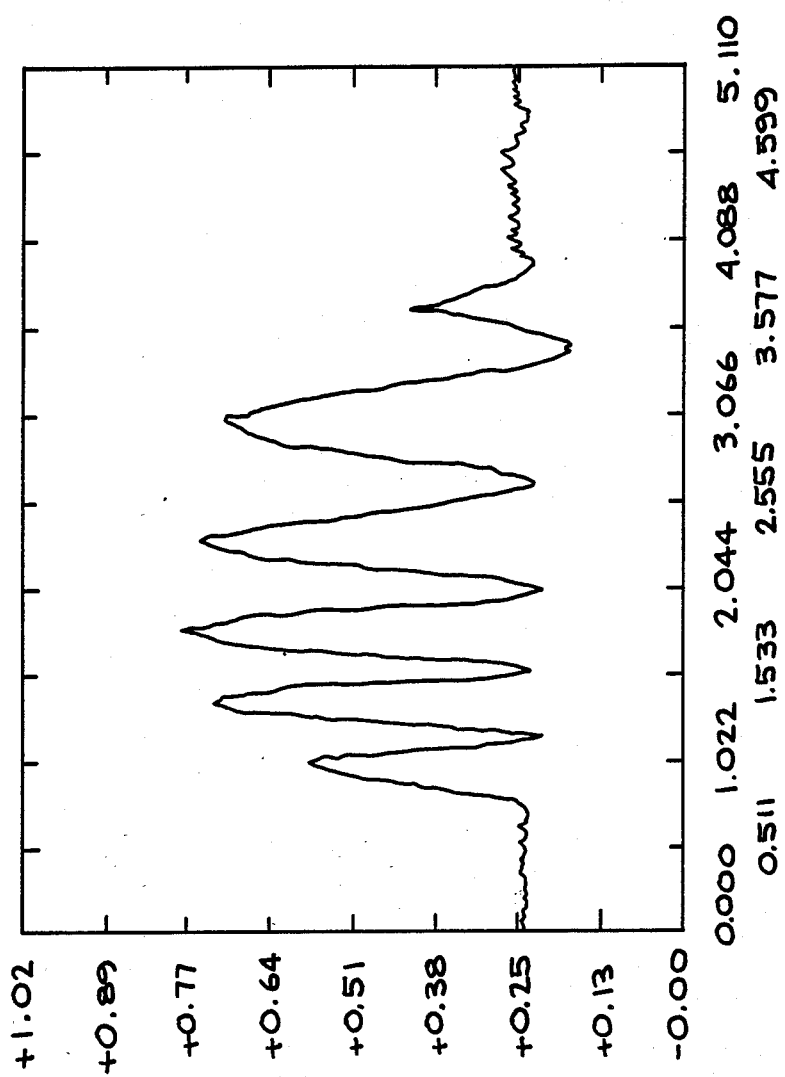
FIG. 7 depicts raw data from the transient digitizer of FIG. 6 showing heterodyne beat pulse with chirp.

FIG. 7 show a heterodyne beat pulse using a difference frequency of about 100 MHz, with obvious chirp. The choice of a difference frequency of comparable magnitude to the chirp accentuates the visual effect. These data were taken at the output of a dye MOPA chain operating at an output power level of around 200 watts. The spatial position of the sample within the pulsed laser beam image is unknown.

Computer Analysis Algorithm for Instantaneous Frequency Plots

A more sophisticated computer analysis method yields a plot of laser frequency versus time during the pulse. The basis algorithm for this method is first to normalize the best signal amplitude. The normalized data are then substituted in the equation $y = \arccos(ydata)$. The resulting plot has periodic discontinuities and sign reversals (characteristic of the arccos function) that are removed by processing to yield a continuous plot of relative phase during the pulse. Taking the derivative of the phase plot with respect to time yields a plot of the difference frequency between the pulsed laser and the cw laser versus time. The process of taking the derivative accentuates noise in the data. Smoothing of the phase data with a digital filter or least squares fit improves signal to noise while reducing bandwidth on the chirp information. FIG. 8 graphically demonstrates the steps in this algorithm.

Figure 8A:
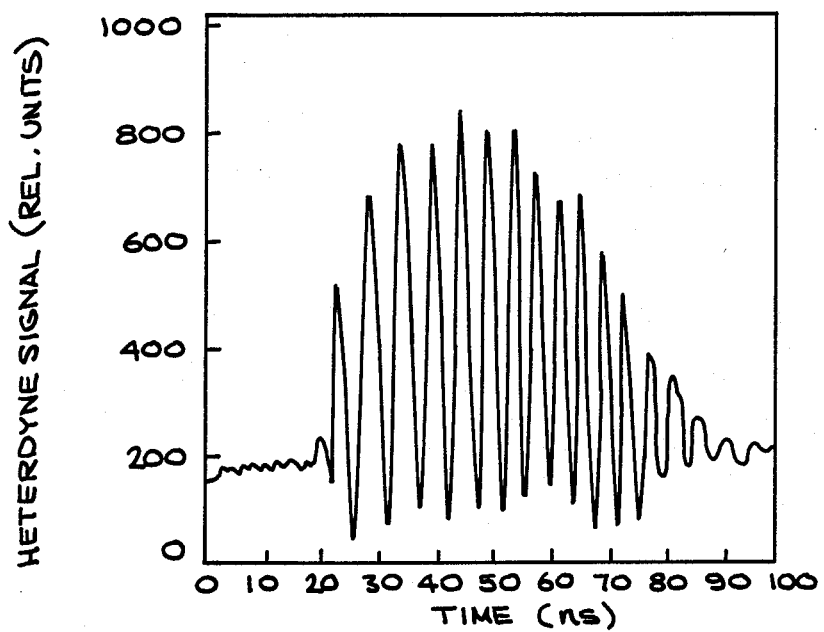
FIGS. 8(a) through 8(r) depict various output displays from the system of FIG. 6.

Specifically, FIG. 8(a) depicts a raw signal voltage from the heterodyne detector. There are 512 values evenly spaced in time in which individual points are connected by straight lines but not marked.

Figure 8B:
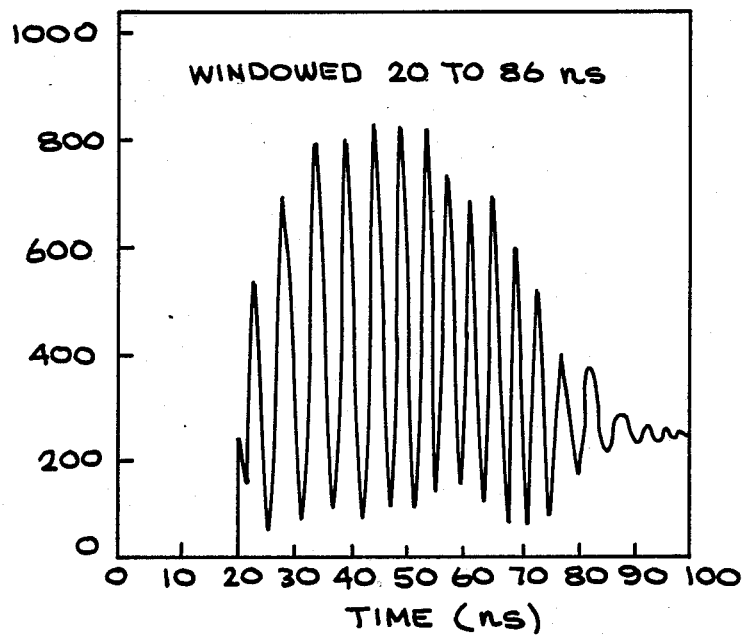

FIG. 8(b) depicts a signal voltage windowed from 20 ns to 86 ns to remove noise.

Figure 8C:
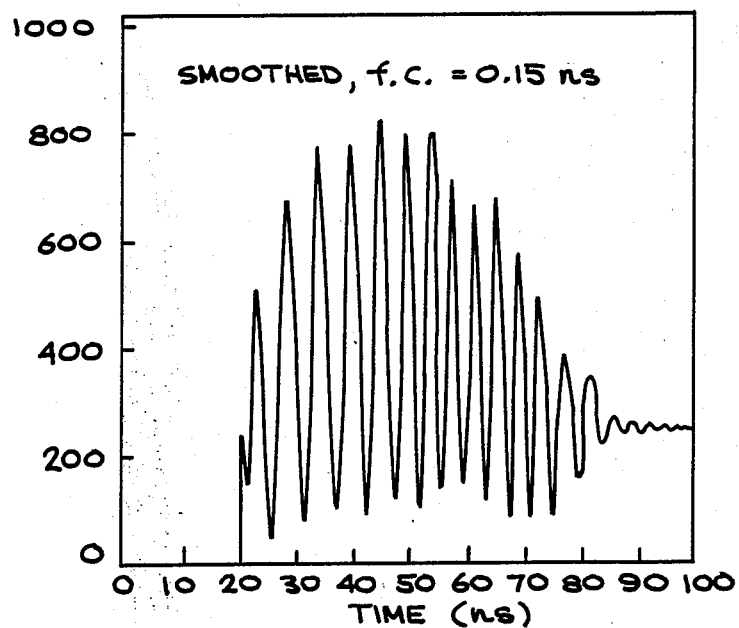

FIG. 8(c) depicts a signal smoothed with 0.15 ns time constant to remove spikes.

Figure 8D:
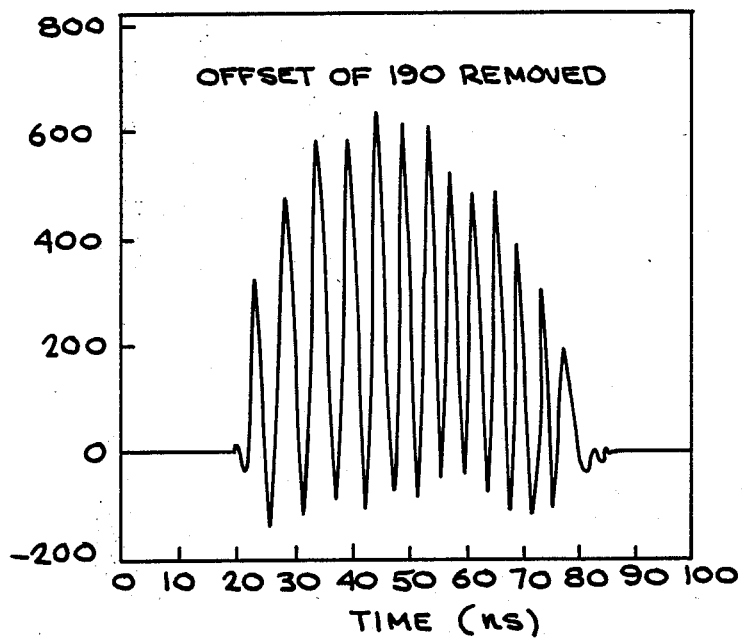

FIG. 8(d) depicts an offset with 190 units removed.

Figure 8E:
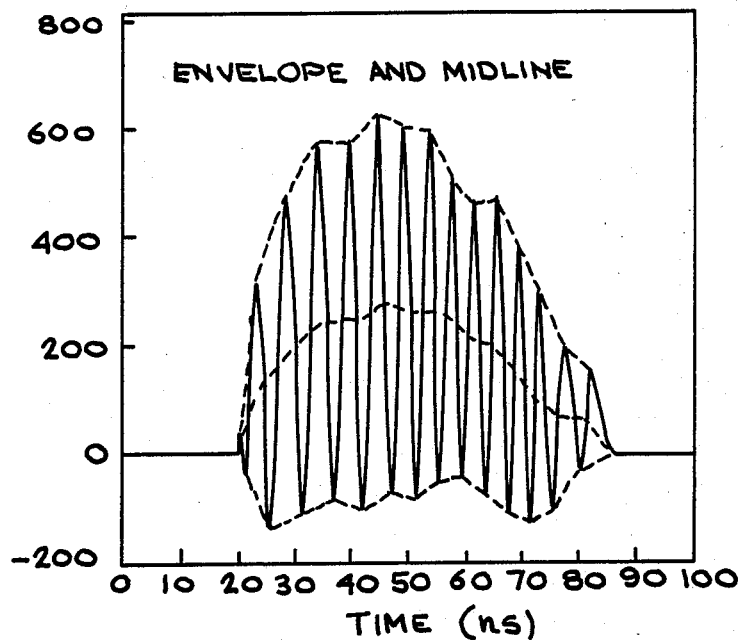

FIG. 8(e) depicts maxima and minima connected to create an envelope in which the midline of the envelope is constructed.

Figure 8F:
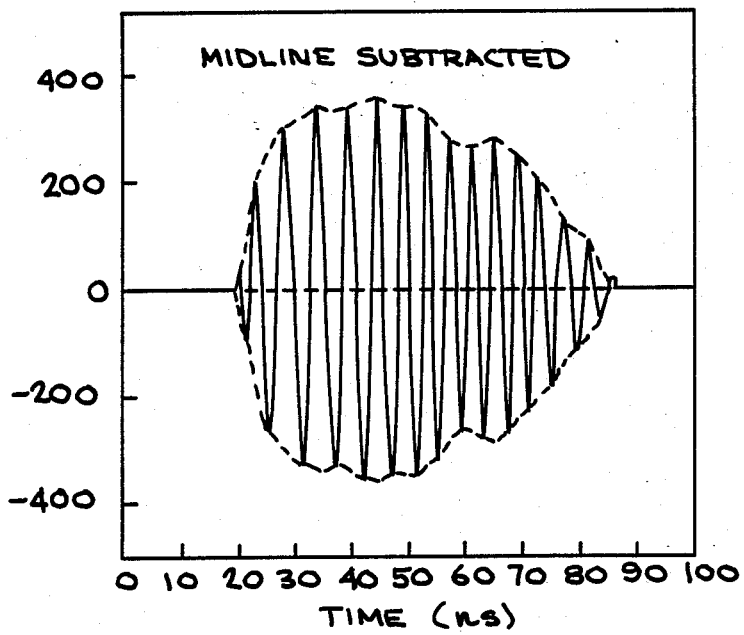

FIG. 8(f) depicts midlines subtracted from data to create a symmetric envelope.

Figure 8G:
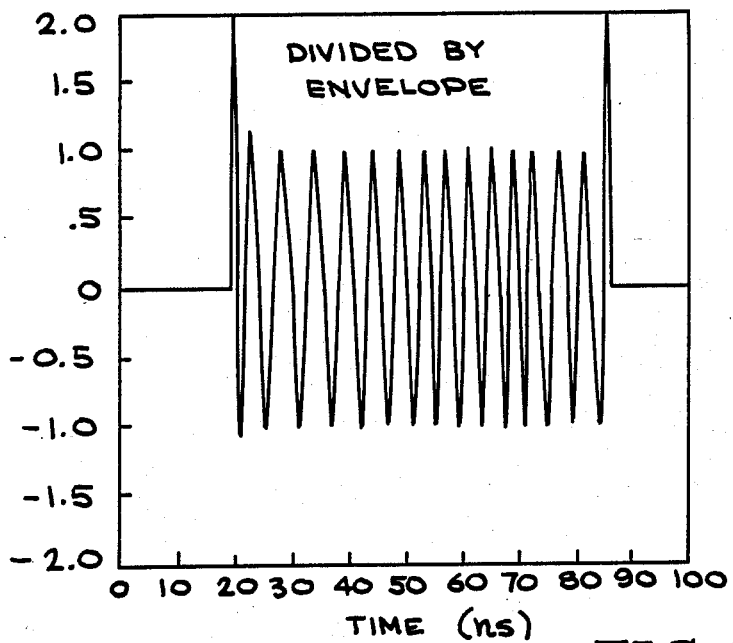

FIG. 8(g) depicts data divided by symmetric envelope to create constant amplitude while preserving phase information.

Figure 8H:
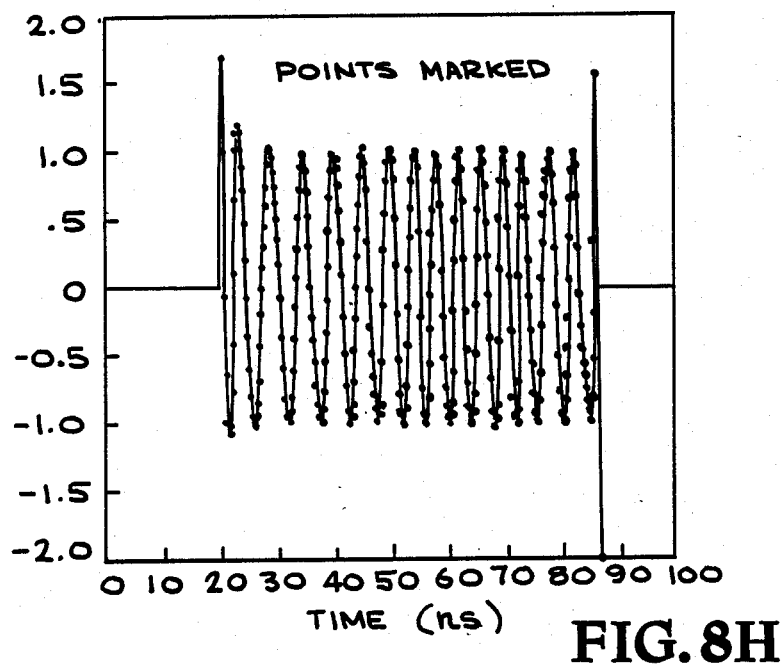

FIG. 8(h) is the same depiction as for FIG. 8G but with data points now marked.

Figure 8I:
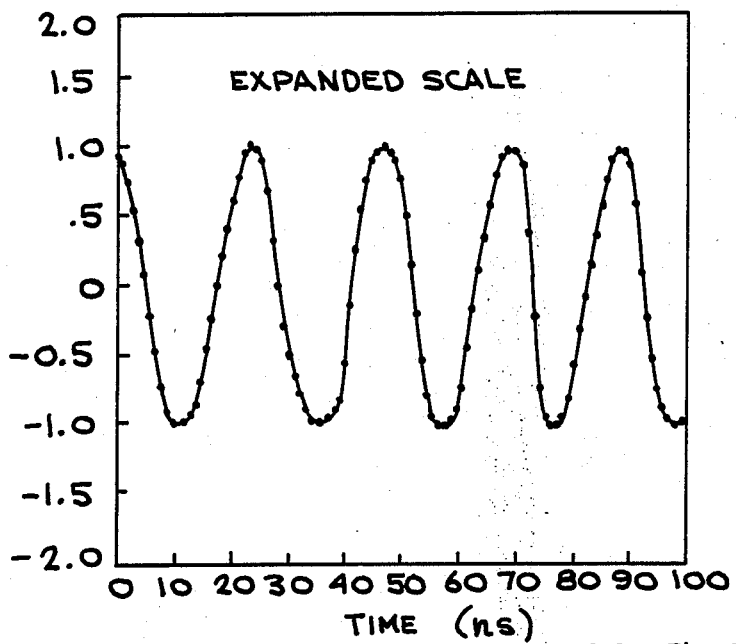

FIG. 8(i) depicts expanded time scale to show details of oscillation.

Figure 8J:
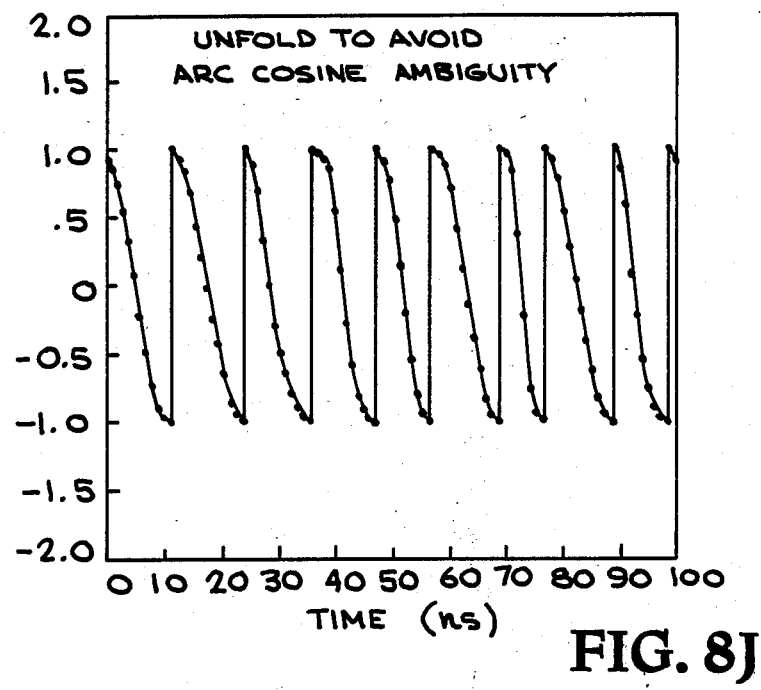

FIG. 8(j) depicts ascending half cycles inverted (unfolded) to avoid subsequent ambiguity when taking the arc cosine.

Figure 8K:
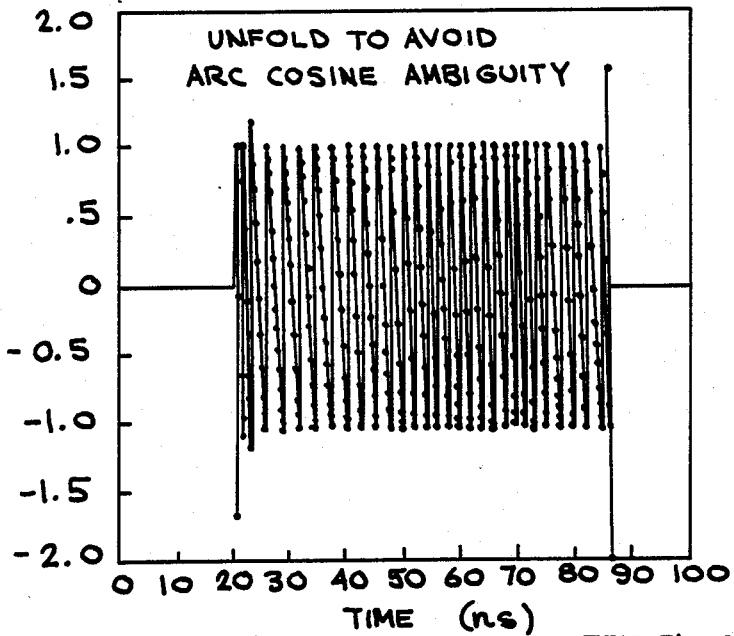

FIG. 8(k) depicts the same view as FIG. 8(j) but showing full time scale.

Figure 8L:
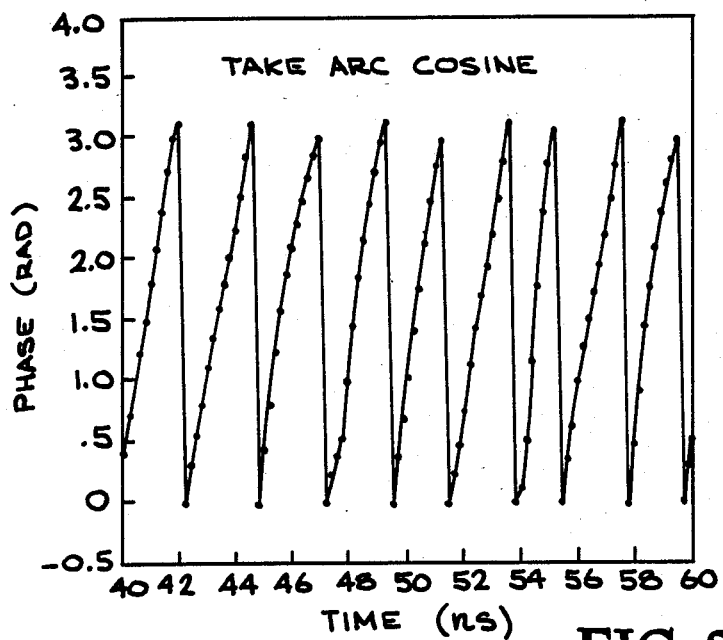

FIG. 8(l) depicts a taking of the arc cosine of FIG. 8(j).

Figure 8M:
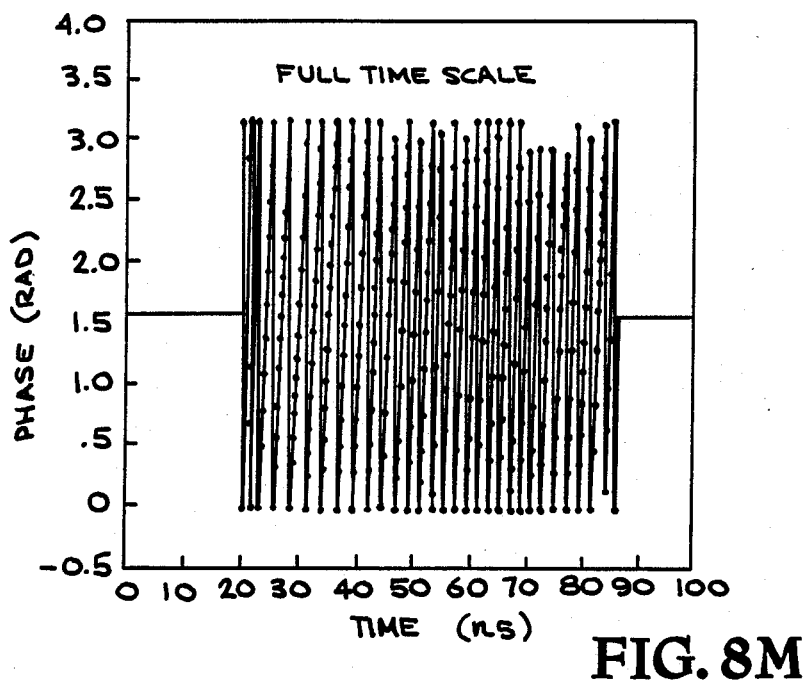

FIG. 8(m) depicts the same view as FIG. 8(l) but with full time scale.

Figure 8N:
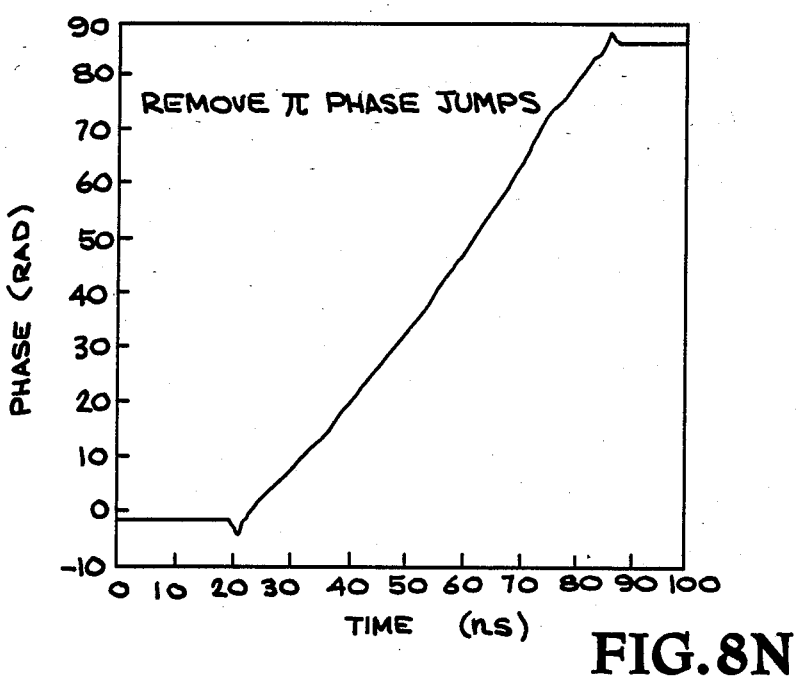

FIG. 8(n) depicts the removal of phase jumps of from FIG. 8(n).

Figure 8O:
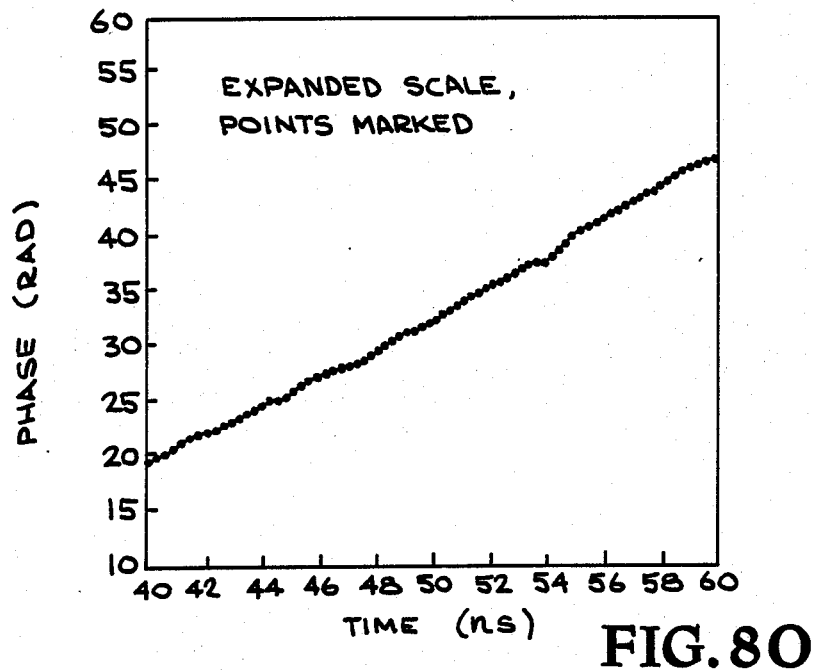

FIG. 8(o) depicts the same view as 8(n) but with expanded time scale and with points marked.

Figure 8P:
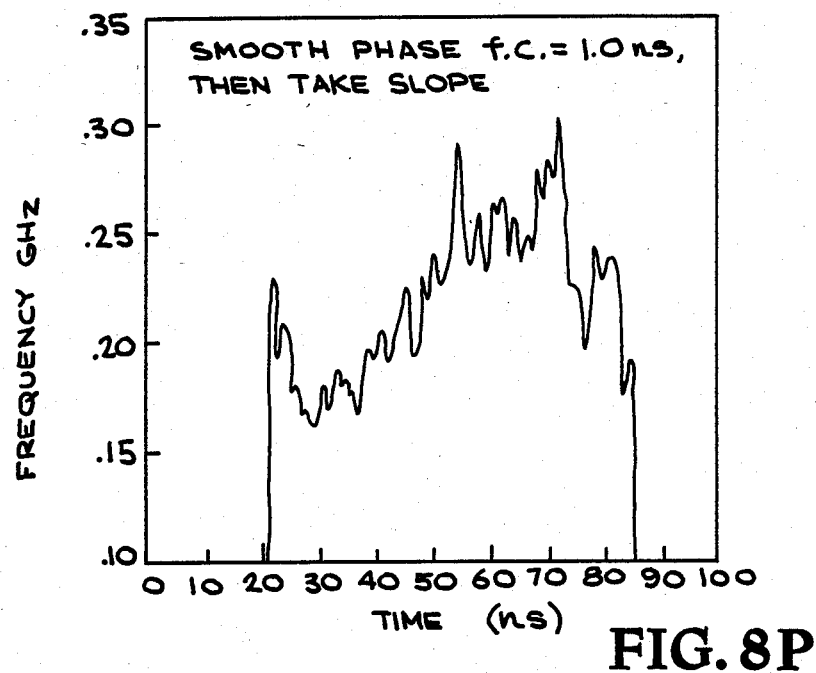

FIG. 8(p) is produced from FIG. 8(o) by smoothing with 1.0 ns time constant and finding local slope of result. Units are converted from rad/ns to GHz. The average frequency is apparently about 220 MHz.

Figure 8Q:
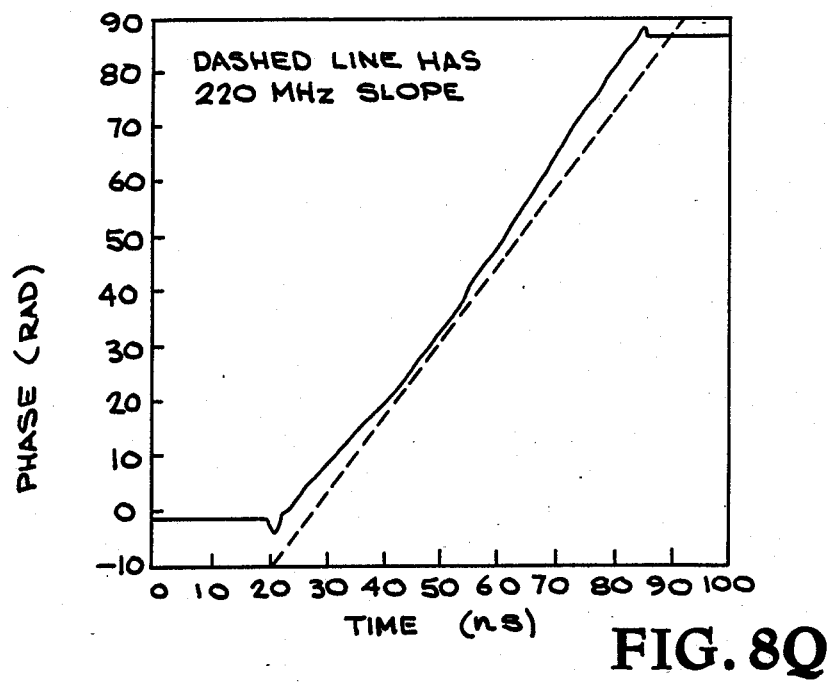

FIG. 8(q) depicts the same view as FIG. 8(n) but with dashed line added to show phase vs. time for a fixed frequency of 220 MHz.

Figure 8R:
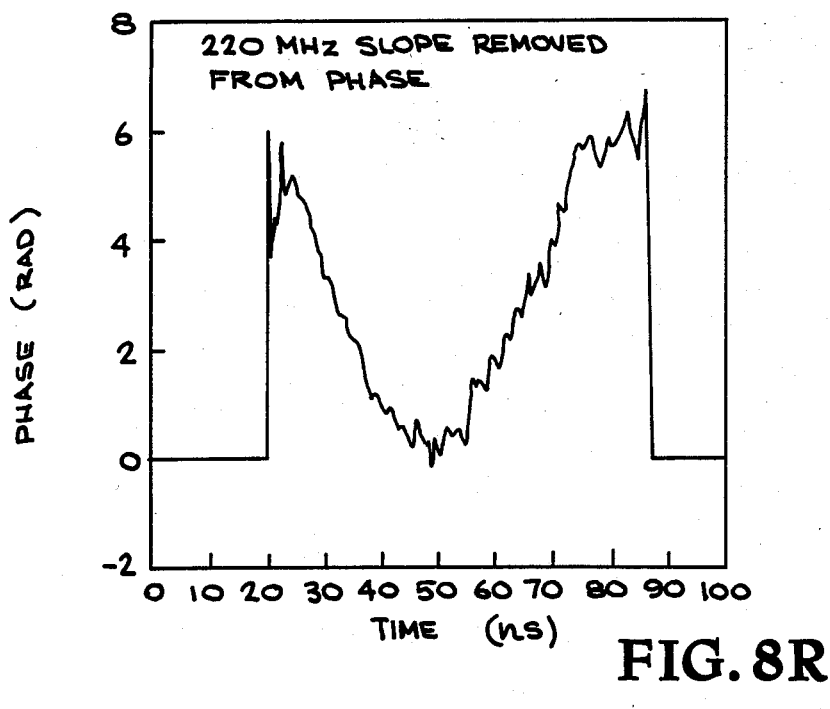
Figure 9A:
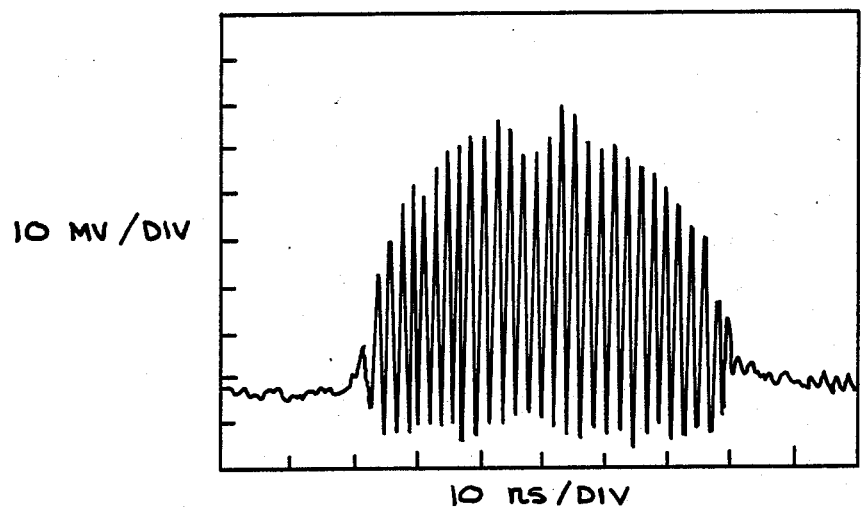
FIGS. 9A through 9T depict various signals of the system of FIG. 6.
Figure 9B:
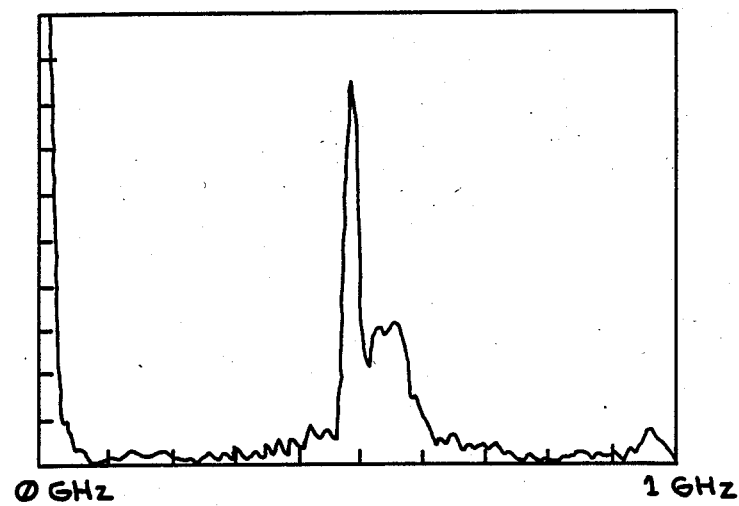
Figure 9C:
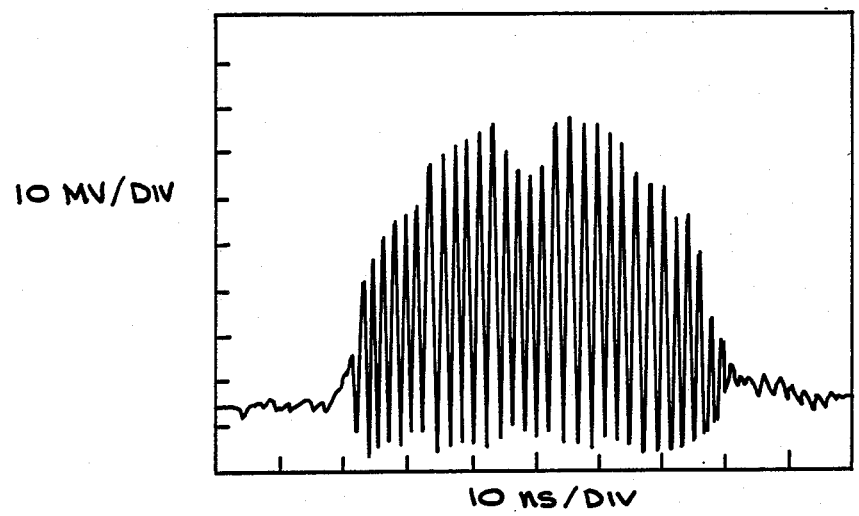
Figure 9D:
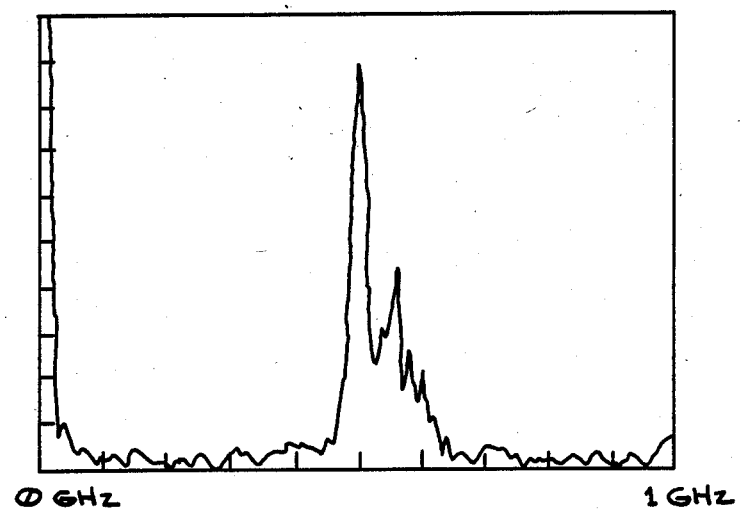
Figure 9E:
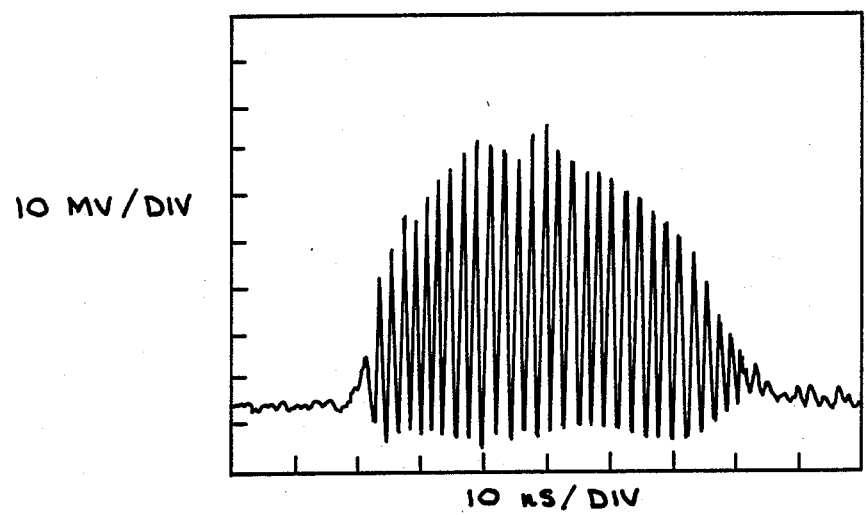
Figure 9F:
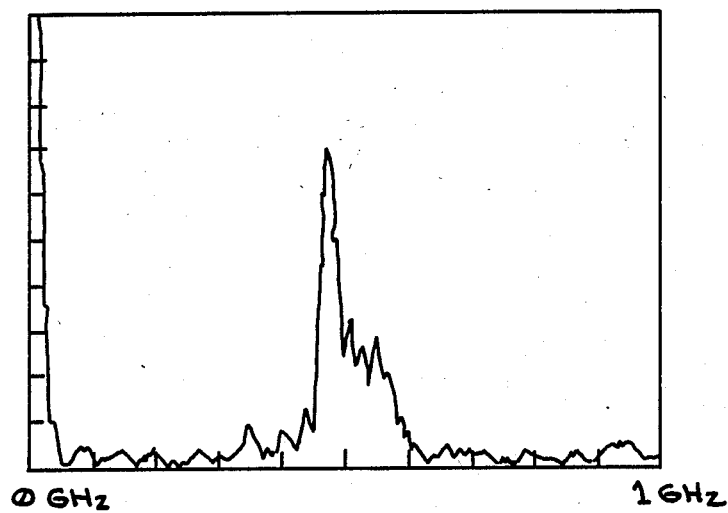
Figure 9G:
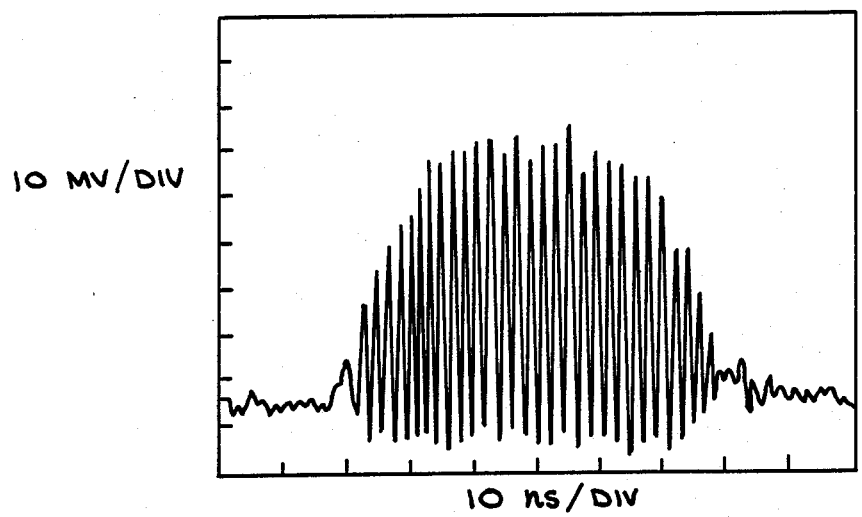
Figure 9H:
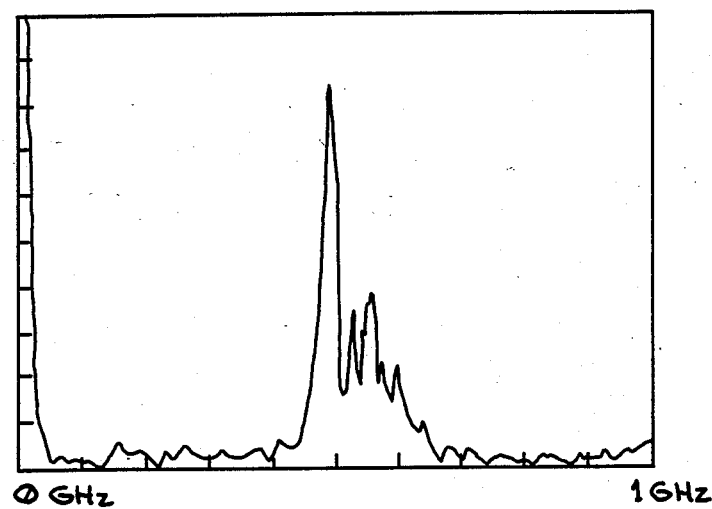
Figure 9I:
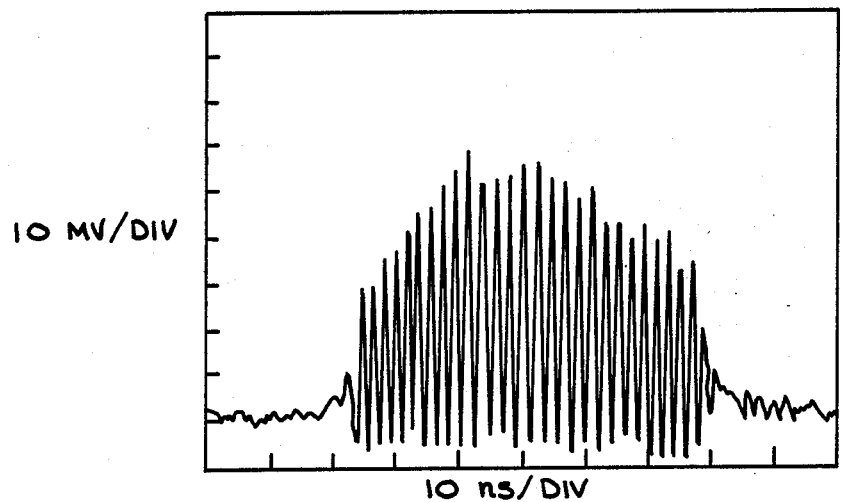
Figure 9J:
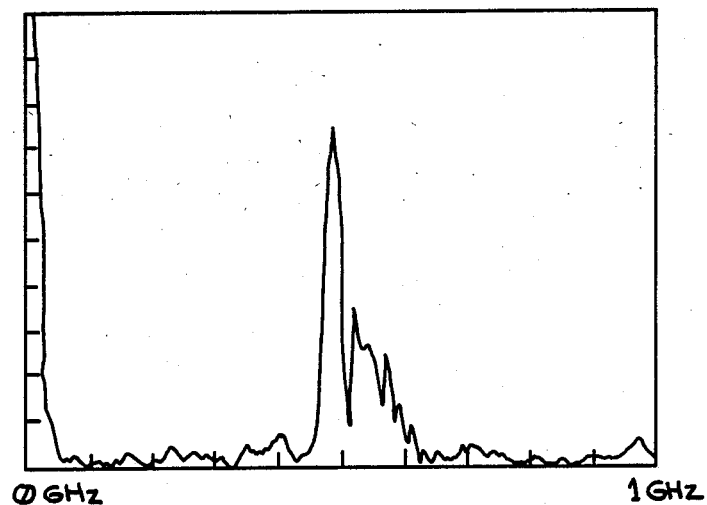
Figure 9K:
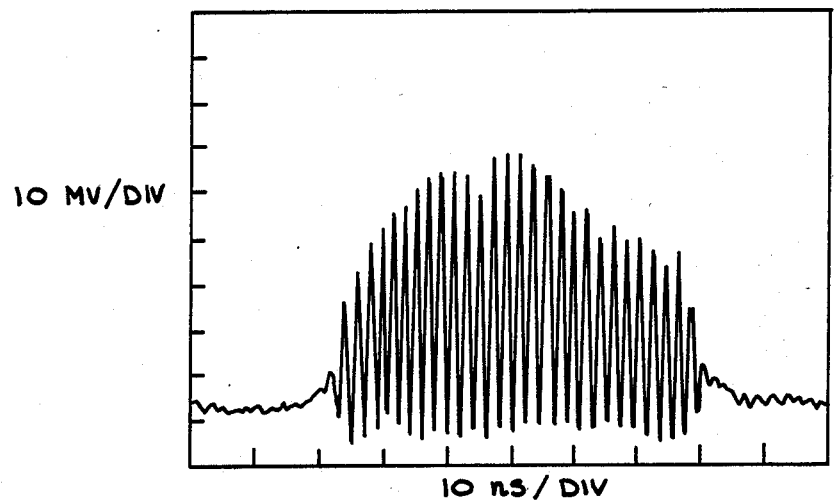
Figure 9L:
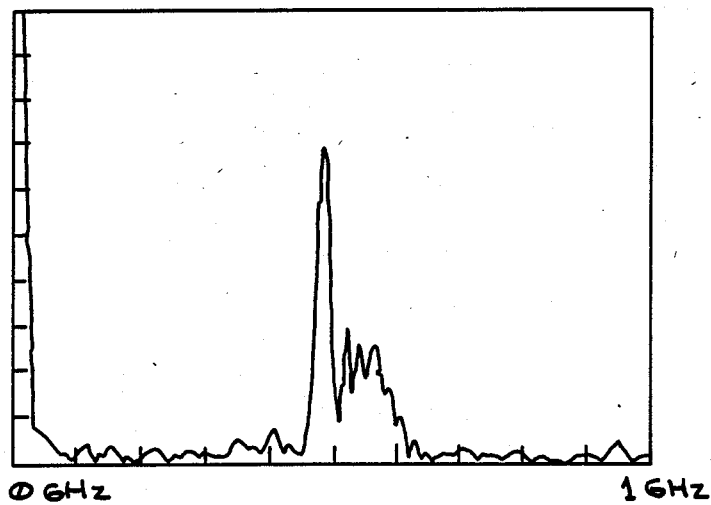
Figure 9M:
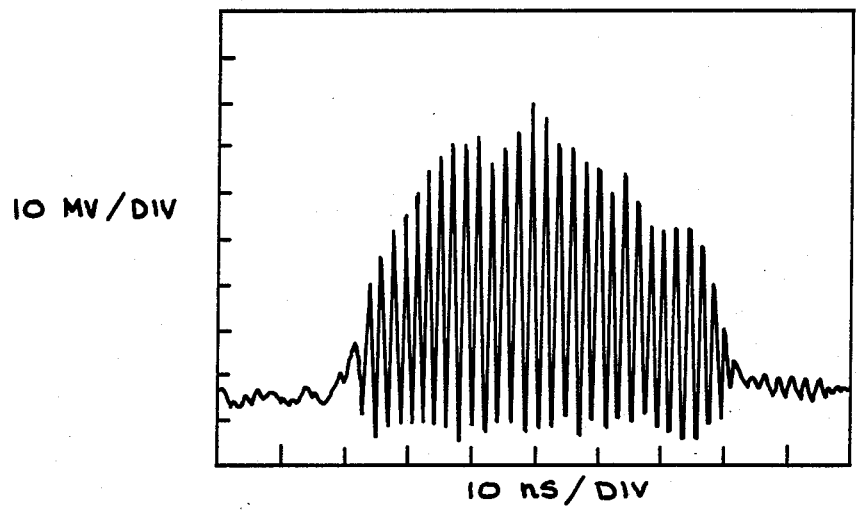
Figure 9N:
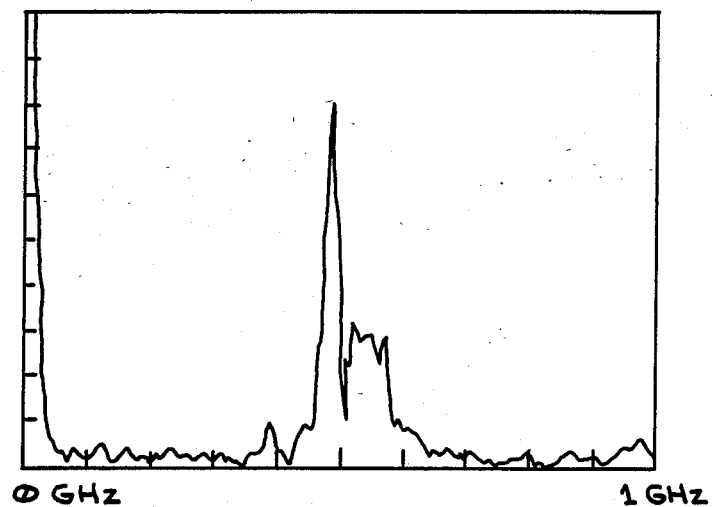
Figure 9O:
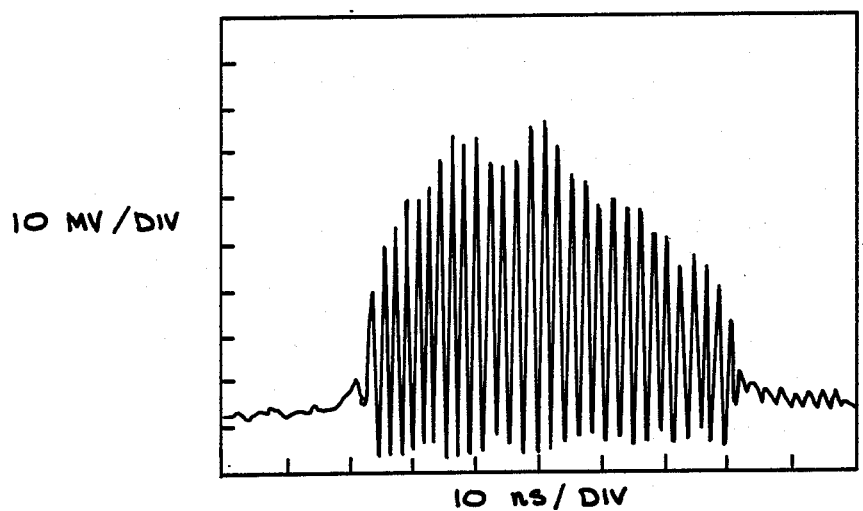
Figure 9P:
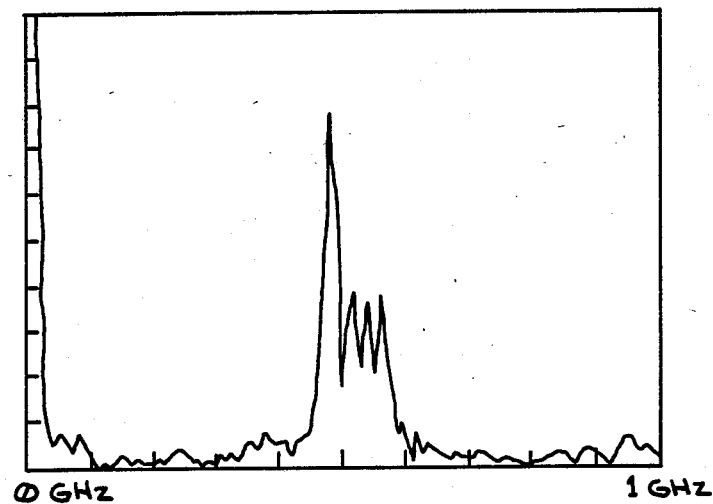
Figure 9Q:
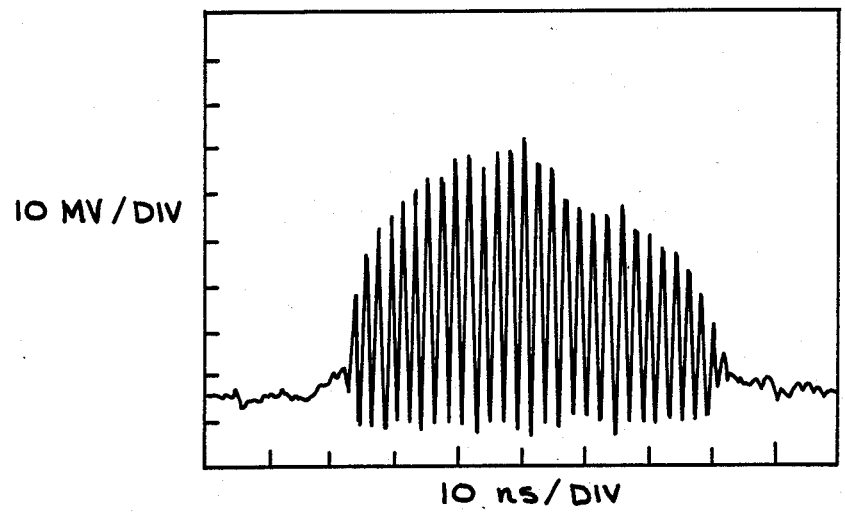
Figure 9R:
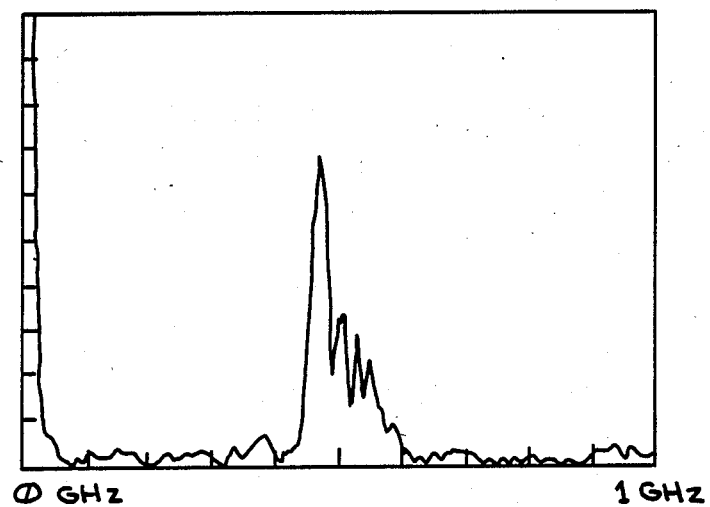
Figure 9S:
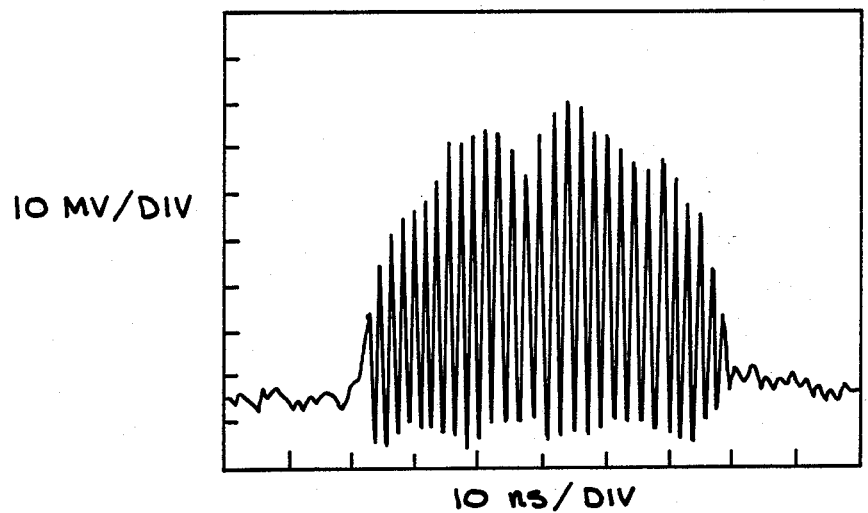
Figure 9T:
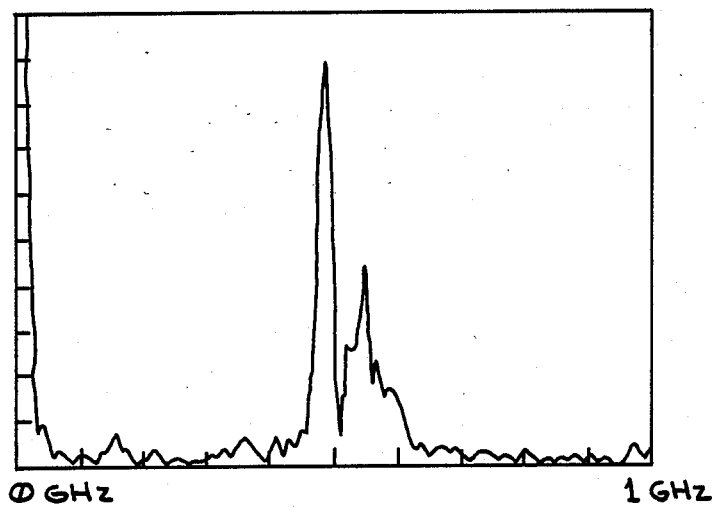

FIG. 8(r) depicts the phase difference between the date of FIG. 8(q) and fixed frequency of 220 MHz. The arbitrary fixed phase is subtracted from the result.

Fast Fourier Transform Method (FFT)

Another method of analysis is to take the magnitude of the FFT of the time response data, which gives a plot of the electric field versus frequency of a single pulse. This procedure yields data on linewidth and center frequency of a individual pulse and aids in determination of pulse-to-pule variations. However, the time domain information on the frequency chirp within the pulse is lost. The domain data from ten pulses collected over a 3-second time interval and their computer generated frequency domain FFT's are shown in FIG. 9.

Specifically, FIGS. 9(a)-9(j) depict heterodyne beat and FFT for ten laser pulses in a three-second interval.

Figure 10:
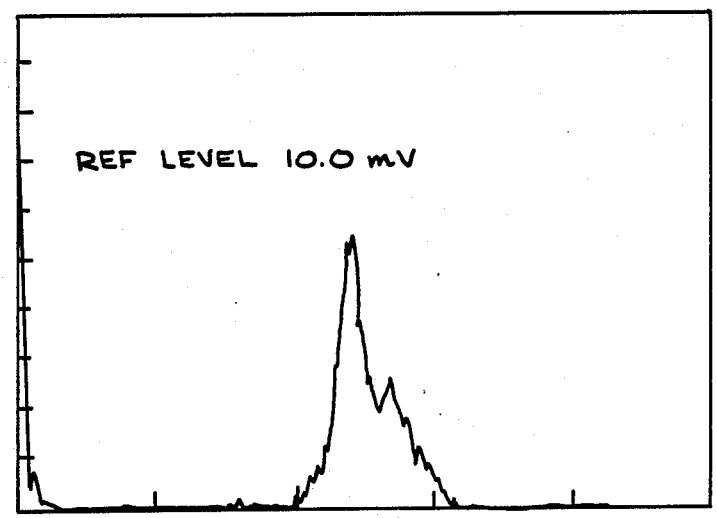
FIGS. 10A and 10B depict a comparison of average of ten FFT's of FIG. 9 to spectrum analyzer averaged data.
Figure 10:
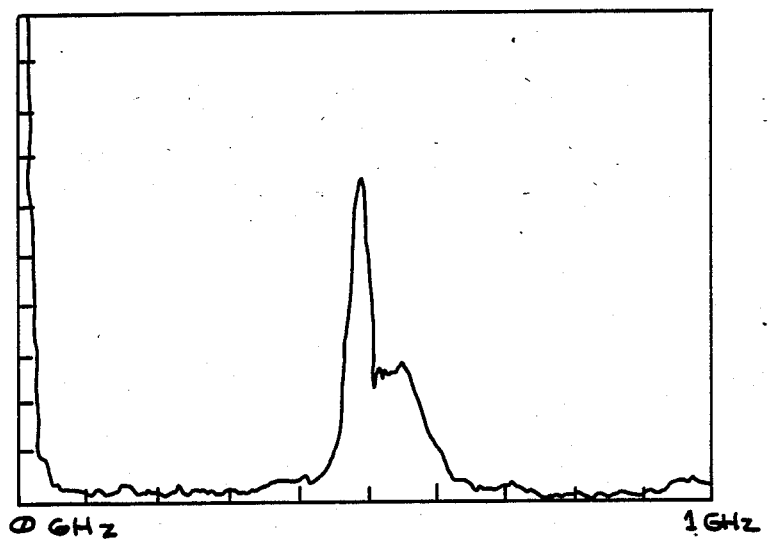

FIG. 10 shows the average of the ten FFT's compared to data that were taken concurrently using a multiple pulse average on an electronic spectrum analyzer 124.

Specifically, FIGS. 10(a) and 10(b) show the comparison of average of ten FFT's of FIG. 9 to spectrum analyzer average data.

According to a further aspect of the present invention, the system's post signal processing software provides several important capabilities.

The system is capable of processing, in one embodiment, 100 consecutively acquired laser heterodyne signals and determining the average instantaneous frequency versus time. Two signal processing techniques that allow this greater performance are the removal of a low frequency envelope signal and the normalization of the waveform.

Figure 11A:
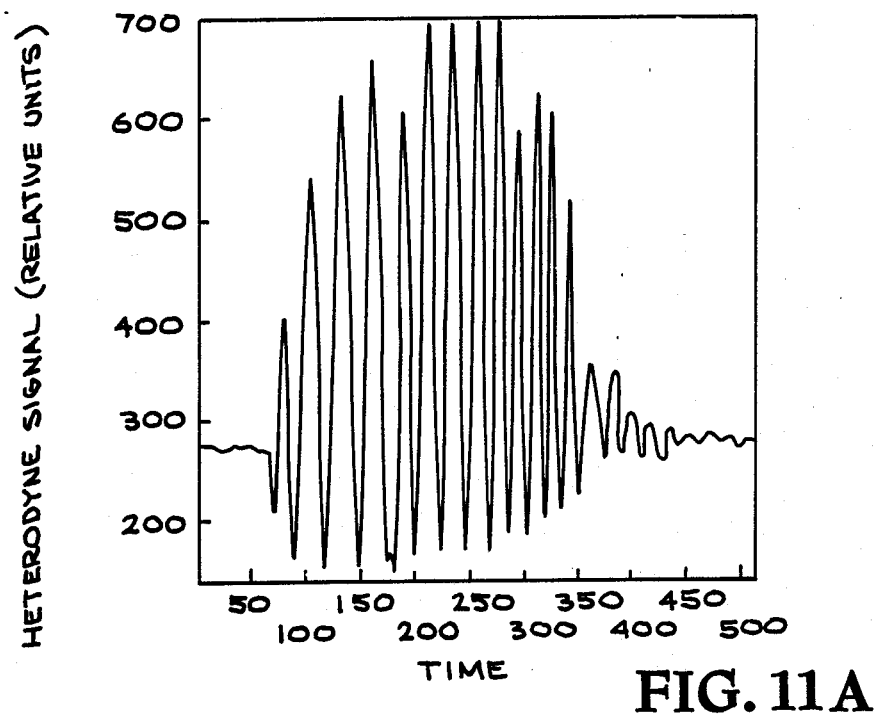
FIGS. 11A and 11B depict heterodyne waveforms acquired by the digitizer of FIG. 6.
Figure 11B:
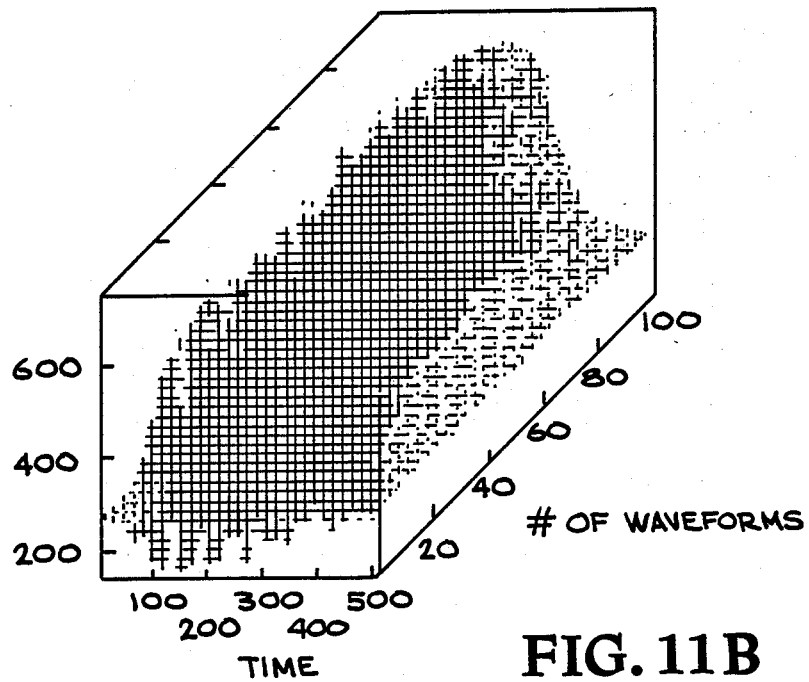

FIGS. 11 through 15 show both a single waveform in the upper portion of the drawing and a family of 100 waveforms in the lower portion of the drawing (e.g., FIGS. 11A and FIG. 11B). This is done to make the signal processing steps more clear, since the 100 waveform case is highly overlaid.

FIG. 11 depicts the typical heterodyne waveforms acquired by the digitizer 130 of FIG. 6.

Figure 12A:
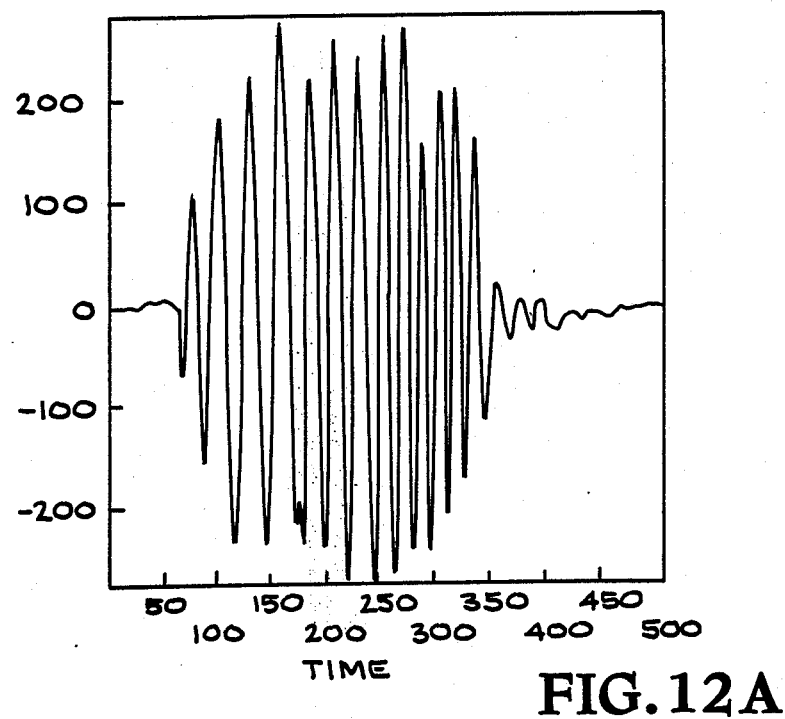
FIGS. 12A and 12B depict the resulting waveform from FIG. 11 after an envelope signal has been removed from raw data.
Figure 12B:
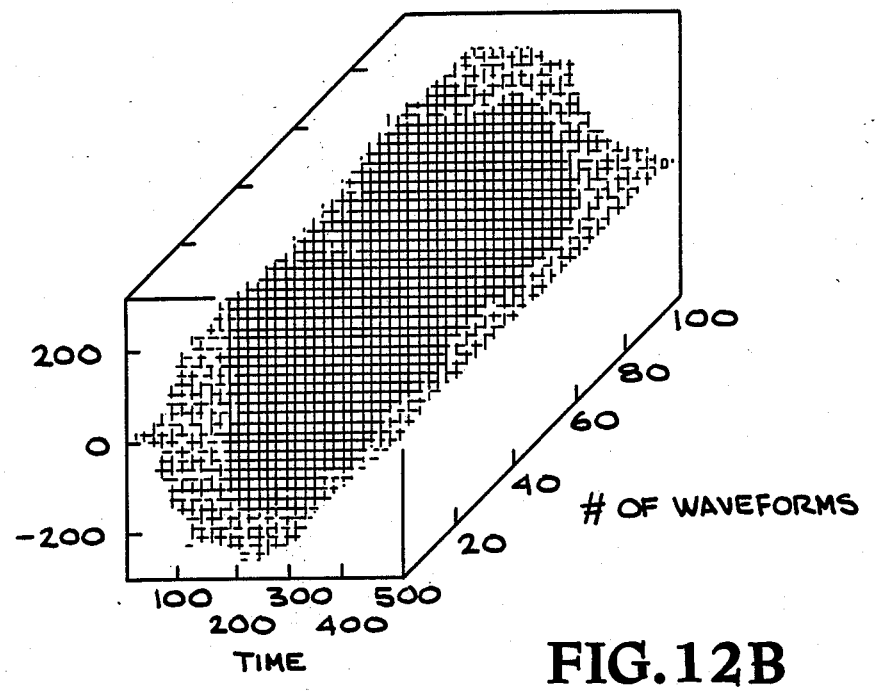

FIG. 12 shows the result after the envelope signal has been removed from the raw data. This envelope signal is the result of the heterodyne mixing in the photodetector 110 and would cause an error in the final result if not removed. The envelope signal consists of low frequency components which are removed by Fourier transforming the raw signal, windowing, and inverse Fourier transforming. This computational method simplifies the batch processing of 100 waveforms.

Figure 13A:
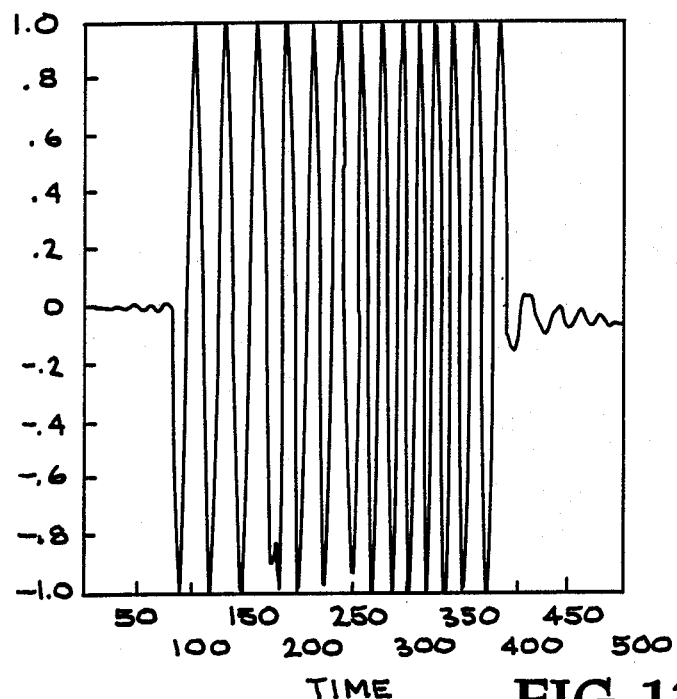
FIGS. 13A and 13B depict a waveform from FIG. 12 after amplitude normalization.
Figure 13B:
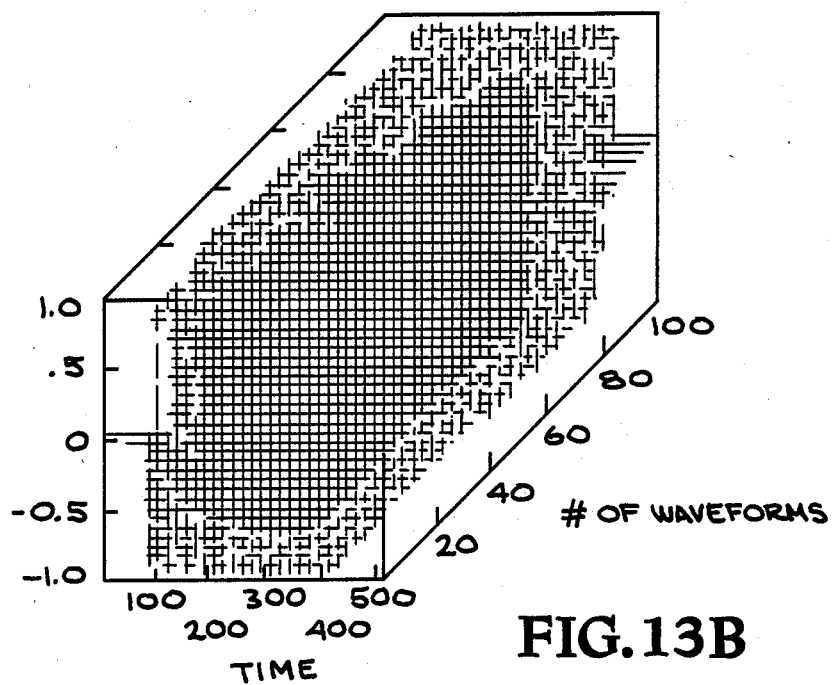

FIG. 13 shows the waveform after amplitude normalization. Normalization is necessary to remove the amplitude variations of the pulsed laser 122 of FIG. 6 and is achieved by holding the zero crossing points fixed and stretching all of the individual half-cycles to a constant value. While this step appears straightforward, it can be very difficult, since the number of half-cycles and zero crossings can change from waveform to waveform in the same family of waveforms.

Figure 14A:
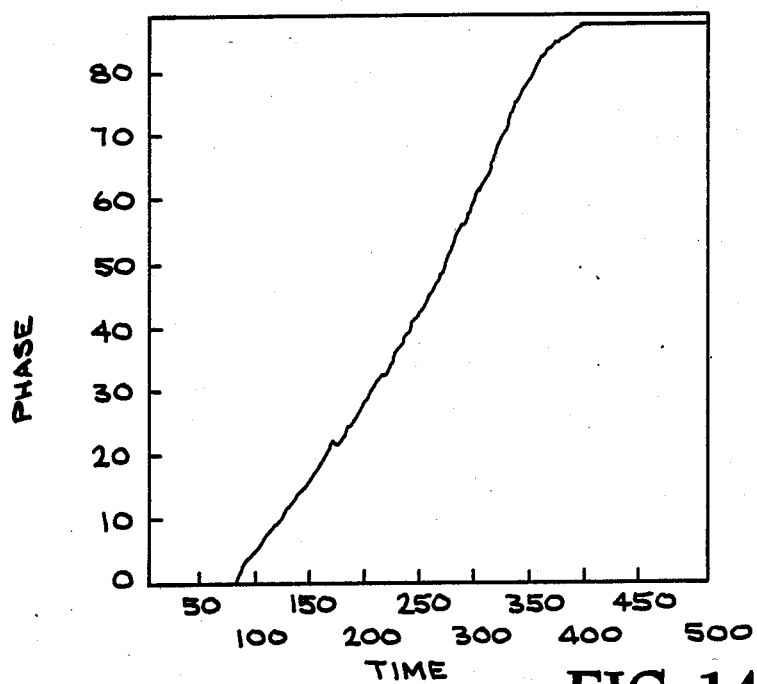
FIGS. 14A and 14B depict a diagram illustrating instantaneous phase versus time.
Figure 14B:
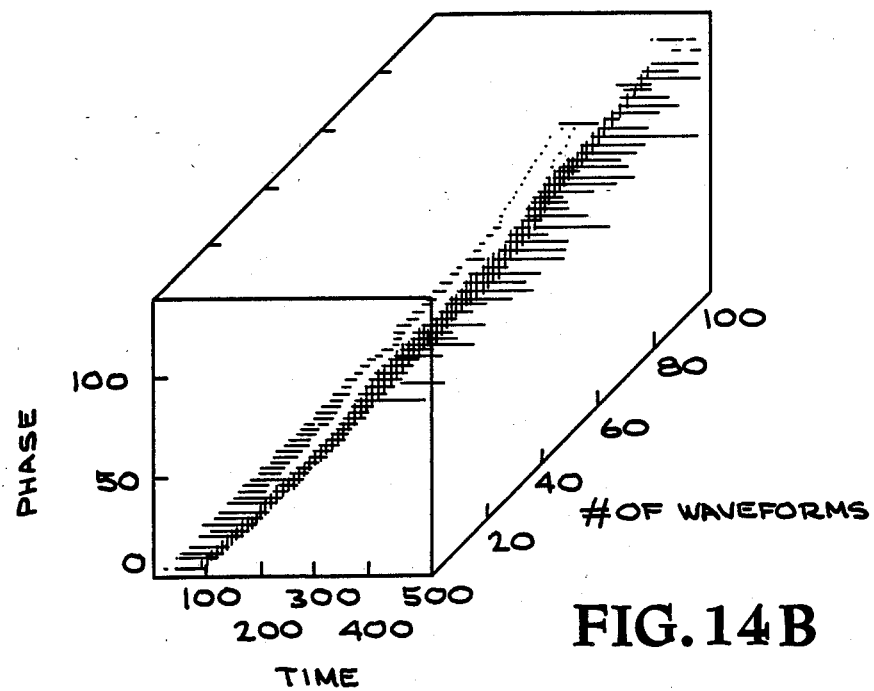
Figure 15A:
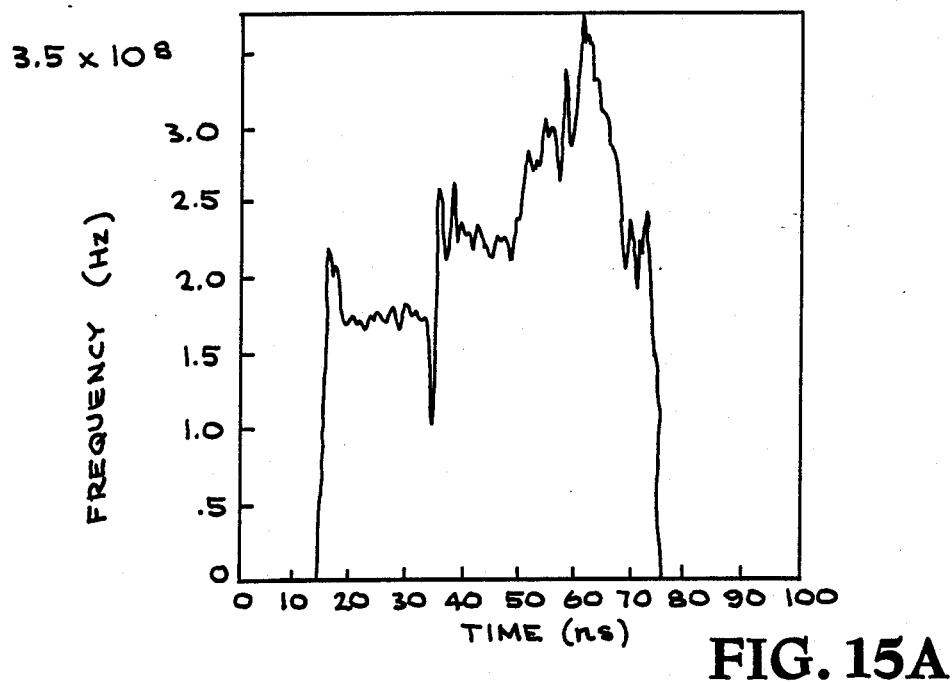
FIGS. 15A and 15B depict the end result of instantaneous frequency versus time.
Figure 15B:
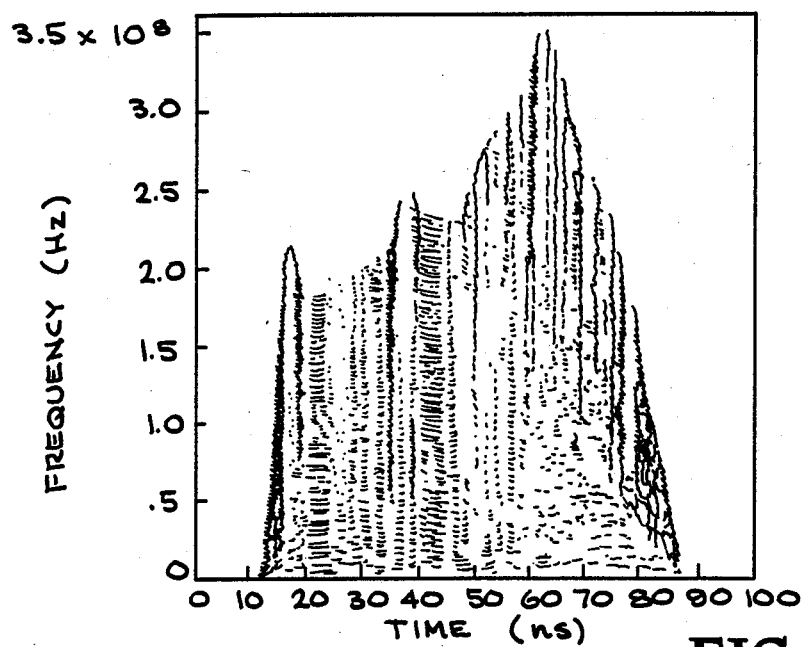

FIG. 14 depicts the instantaneous phase versus time. FIG. 15 shows the end result of instantaneous frequency versus time. The bottom of FIG. 15 is a running summation of the 100 individual results with the top line having the correct Y-axis frequency scaling.

Possible Applications

Some important possible applications of the instantaneous optical frequency measurement system are:

Single laser pulse investigations of frequency variation versus time (chirp).

Single laser pulse spectrum by taking the FFT of the beam pulse time-domain data.

If the cw laser is locked to an absolute frequency reference, the offset of the pulsed laser frequency can be measured for individual pulses. Due to the typical frequency spacing between spectral reference line, a wider bandwidth amplifier and transient digitizer is required. A suitable 6-GHz-bandwidth transient digitizer has recently been introduced, the Tektronix Model 7250.

By varying location and polarization of the input fiber, spatial and polarization effects may also be investigated for all of the measurements mentioned above.

SUMMARY

A heterodyne diagnostic system provides high resolution data on the frequency stability of a pulsed dye laser system. It is now possible to characterize the offset of the average laser frequency to an absolute reference with an accuracy of at least 1 MHz as well as to make measurements of the pulse-to-pulse and intrapulse variations of the laser frequency. The relative power spectral density of spurious modes or intermodulation products is also measurable with a wide dynamic range.

Preliminary data taken at the output of the last dye amplifier indicate a measurable pulse-to-pulse variation of average laser frequency. A variation of laser frequency during the pulse period has also been observed. The magnitude, origin, spatial dependence, power level dependence, and polarization dependence of these variations in laser frequency are not yet adequately characterized. The maximum magnitude of the frequency variations observed indicates a probable small effect on AIS (Atomic Isotope Separation) performance, and a more significant and possibly important effect on SIS (Special Isotope Separation) performance.

The foregoing description of the preferred embodiment of the invention has been presented for purposes of illustration and description. It is not intended to be exhaustive or to limit the invention to the precise form disclosed, and many modifications and variations are possible in light of the above teaching.

The preferred embodiment was chosen and described in order to best explain the principles of the invention and its practical applications to thereby enable others skilled in the art to best utilize the invention and various embodiments and with various modifications as are suited to the particular use contemplated. It is intended that the scope of the invention be defined only by the claims appended thereto.

We claim:

1. A laser optical spectrum analyzer comprising
   a pulsed laser for generating a series of pulsed laser beams,
   a continuous wave (CW) laser for generating a continuous wave (CW) laser beam,
   means for measuring the average power spectrum of said series of pulsed laser beams, including means for heterodyning said series of pulsed laser beams with said CW laser beam to from a heterodyned output, including
   means for detecting the heterodyned output,
   means for analyzing said heterodyned output, including
   means for sampling the output of said analyzing means, and
   means for plotting the average frequency spectrum with respect to time of said series of pulsed laser beams.

2. A system for measuring the instantaneous frequencies of a series of pulsed laser beams comprising
   a pulsed laser for generating a series of pulsed laser beams comprising
   a pulsed laser for generating a series of pulsed laser beams,
   a continuous wave (CW) laser for generating a continuous wave laser beam,
   means for heterodyning said series of pulsed laser beams with said CW laser beam to form a heterodyned output, and
   means for analyzing in the time domain said heterodyned output to provide a plot of the instantaneous frequency of said pulsed laser beams.

3. A laser heterodyne processing system comprising
   means for heterodyning a continuous wave laser beam with a series of pulsed laser beams having a frequency to be determined to form a plurality of laser heterodyne signals, and
   processing means for determining the average instantaneous frequency versus time of said laser beams.

4. A system as in claim 3 wherein said laser heterodyne signals include a low frequency envelope signal and wherein said processing means include means for removing the low frequency envelope signal from said laser heterodyne signals.

5. A system as in claim 4 wherein said processing means include means for amplitude normalizing said laser heterodyne signals.

6. A system as in claim 5 wherein said means for amplitude normalizing include means for holding the zero crossing points of said laser heterodyne signals fixed and means for stretching all the individual half-cycles to a constant value.

* * * * *